US012709196B2

(12) United States Patent
Schrand et al.

(10) Patent No.: US 12,709,196 B2
(45) Date of Patent: Aug. 18, 2026

(54) ELECTRIC SLIDE RAIL SYSTEMS AND METHODS

(71) Applicant: TS TECH CO., LTD, Asaka (JP)

(72) Inventors: Justin Schrand, Ferndale, MI (US); Dean Vandenheede, Franklin, MI (US)

(73) Assignee: TS TECH CO., LTD, Asaka (JP)

( * ) Notice: Subject to any disclaimer, the term of this patent is extended or adjusted under 35 U.S.C. 154(b) by 148 days.

(21) Appl. No.: 18/623,590

(22) Filed: Apr. 1, 2024

(65) Prior Publication Data

US 2024/0336168 A1 Oct. 10, 2024

Related U.S. Application Data

(60) Provisional application No. 63/494,125, filed on Apr. 4, 2023.

(30) Foreign Application Priority Data

Feb. 27, 2024 (WO) .................. PCT/JP2024/007142

(51) Int. Cl.

*B60N 2/02* (2006.01)
*B60N 2/06* (2006.01)
*B60N 2/07* (2006.01)

(52) U.S. Cl.

CPC ......... *B60N 2/02258* (2023.08); *B60N 2/067* (2013.01); *B60N 2/0715* (2013.01)

(58) Field of Classification Search

CPC ... B60N 2/02258; B60N 2/067; B60N 2/0715
See application file for complete search history.

(56) References Cited

U.S. PATENT DOCUMENTS

2003/0052246 A1* 3/2003 Hoshihara .............. B60N 2/067 248/430
2003/0173809 A1* 9/2003 Moradell ............... B60N 2/067 297/344.1

(Continued)

FOREIGN PATENT DOCUMENTS

JP H0199734 A 4/1989
JP H0199734 U 7/1989

(Continued)

OTHER PUBLICATIONS

International Search Report and Written Opinion issued Jun. 11, 2024, in PCT/IB2024/053254, 7 pages.

(Continued)

*Primary Examiner* — Rodney A Bonnette
(74) *Attorney, Agent, or Firm* — Vorys, Sater, Seymour and Pease LLP; Rex W. Miller, II

(57) ABSTRACT

An electric slide rail that can suppress fluctuations in the contact position between a screw member and an engagement hole in a rail are disclosed. The rail is operable with a sliding assembly that includes a screw member. The rail includes a sidewall extending along a rail axis and having a front end and a rear end, a plurality of engagement slots formed in the sidewall between the front end and the rear end. Each of the plurality of engagement slots has a clearance portion, an upper engagement portion in communication with an upper end of the clearance portion, and a lower engagement portion in communication with a lower end of the clearance portion. Each of the plurality of engagement slots extends with respect to a second axis perpendicular to the rail axis, and the upper engagement portion and the lower engagement portion are configured to engage the screw member.

19 Claims, 31 Drawing Sheets

(56) References Cited

U.S. PATENT DOCUMENTS

| | | | | |
|---|---|---|---|---|
| 2012/0024564 | A1* | 2/2012 | Sekino | B60N 2/0715 174/68.3 |
| 2022/0080862 | A1* | 3/2022 | Simms | B60N 2/0705 |

FOREIGN PATENT DOCUMENTS

| | | | |
|---|---|---|---|
| JP | H10138803 | A | 5/1998 |
| JP | 2003063284 | A | 3/2003 |
| JP | 2005313662 | A | 11/2005 |
| JP | WO2020141600 | A1 | 11/2021 |
| WO | 2023074692 | A1 | 5/2023 |

OTHER PUBLICATIONS

International Search Report and Written Opinion issued May 28, 2024, in International Patent Application No. PCT/JP2024/007142, 7 pages.

* cited by examiner 1
201
202
203
203A
205
206
207
208
208A
209
210
211
212
220
240
243
244
264
265
267
268
275
11
12
15
17
25
XVIII
Rear
Front
Upward
Downward

A1
104
300
2160
120
A2
122
2180
312
310
314
108

ELECTRIC SLIDE RAIL SYSTEMS AND METHODS

CROSS-REFERENCE TO RELATED APPLICATIONS

This application claims priority to and the benefit of U.S. Provisional Patent Application Ser. No. 63/494,125, filed Apr. 4, 2023, the contents of which are incorporated herein by reference. This application also claims priority to and the benefit of International Patent Application Ser. No. PCT/JP2024/007142, filed, Feb. 27, 2024, titled "Electric slide rail, vehicle seat equipped with electric slide rail, and method for manufacturing electric slide rail," the contents of which are incorporated herein by reference.

TECHNICAL FIELD

The present invention relates to a slide rail, and in some an electric slide rail, a vehicle seat equipped with an electric slide rail, and a method for manufacturing an electric slide rail.

BACKGROUND

Existing electric slide rail include an electric slide rail that includes a rail, a slider that is slidably supported by the rail, a screw member that is rotatably supported by the slider, and an electric motor that rotates the screw member. A plurality of engagement holes are formed in the rail to engage with the screw members. As the screw member rotates, the screw member moves relative to the plurality of engagement holes, and the slider moves relative to the rail. The contact position (meshing position) between the screw member and the engagement hole changes due to manufacturing errors and assembly errors. When the contact position between the screw member and the engagement hole changes, the driving force of the electric motor required to move the slider changes, making it difficult to move the slider with high precision. Further, in some cases, a problem arises in that the slider tends to move in response to an external force input to the slider. Japanese Utility Model Publication No. 1-99734 discloses a slide rail for connecting a seat body such as a seat back or a seat cushion of a vehicle seat so as to be slidable relative to a floor is known. The slide rail of Japanese Utility Model Publication No. 1-99734 includes a pair of left and right lower rails fixed to the floor, a pair of left and right upper rails that are slidably coupled to the lower rails and have a seat fixed on the upper surface, and an electric motor that slides the upper rails. Japanese Patent No. 2005-313662 discloses slide rail that allows a seat body to slide, and includes a harness that is fixed to the floor at one end and linked to an upper rail at the other end. The slide rail of Japanese Patent No. 2005-313662 is provided with a winding device that winds up or lets out the harness in conjunction with the movement of the upper rail relative to the lower rail, with a housing space for housing the harness being provided inside the winding device, and the harness is stored at one end in a state where it is wound around a central axis provided in the housing space; however, if the harness is held in a bent state and the bending radius of the harness becomes too small, there is a risk that too much load will be applied to the harness.

Accordingly, a need exists to provide an electric slide rail that can suppress fluctuations in the contact position between the screw member and the engagement hole. Also, a need exists to provide a vehicle seat equipped with an electric slide rail that can suppress fluctuations in the contact position between the screw member and the engagement hole. Moreover, a need exists to provide a method for manufacturing an electric slide rail that can suppress fluctuations in the contact position between the screw member and the engagement hole.

SUMMARY OF THE INVENTION

In order to solve the above problems, one aspect of the present disclosure is an electric slide rail 1 that includes a rail 11 having a groove-shaped cross section and extending along a first direction, and a screw assembly 35 including a slider 12 received in and slidably engaged with the rail, and a screw member 38 supported on the slider for rotation about the first direction; an electric motor 36 supported by the slider and rotating the screw member; and a screw engagement portion 57 extending in the first direction and formed on the rail so as to engage with the screw member. The rail has a pair of side walls 17 facing each other, and the threaded engagement portion is formed on each of the pair of side walls and includes a plurality of engagement portions arranged in the first direction. Each of the engagement holes has a first portion 61 extending at an angle with respect to a second direction perpendicular to the first direction and disposed at the center in the longitudinal direction. A pair of second parts 62A, 62B are arranged on both sides of the first part, and the width of each of the second parts in the first direction is equal to the width of the first part in the first direction. The screw member does not abut the edge 65 of the engagement hole in the first portion and abuts the edge 65 of the engagement hole in at least one of the second portions.

In this aspect, the screw member does not contact the edge of the engagement hole in the first portion, but contacts the edge of the engagement hole in at least one of the second portions, so that the screw member and the engagement hole do not come into contact with each other. The contact position is limited. Thereby, it is possible to provide an electric slide rail that can suppress fluctuations in the contact position between the screw member and the engagement hole.

In the above aspect, the screw member may abut the edge at one of the second portions.

According to this aspect, the contact position between the screw member and the engagement hole is further limited. Thereby, fluctuations in the contact position between the screw member and the engagement hole can be suppressed.

In the above aspect, the screw member may abut on the edge of one of the second portions in the first direction.

According to this aspect, when the screw member pushes the edge of the engagement hole, other parts of the screw member are prevented from coming into contact with the edge of the engagement hole.

In the above aspect, the edge of the engagement hole may have a step 65A at the boundary between the first portion and the second portion.

According to this aspect, contact between the first portion and the screw member is suppressed.

In the above aspect, a gap may be formed within the edge between the edge 65G forming the end of the second portion in the second direction and the screw member.

According to this aspect, contact between the screw member and the end edge portion is suppressed, the generation of abnormal noise is suppressed, and rotational resistance of the screw member is reduced.

In the above aspect, the edge portion may extend parallel to the first direction.

According to this aspect, the shape of the engagement hole can be simplified.

In the above aspect, the pair of side walls are formed with protrusions 22 that protrude toward each other and extend in the first direction, and each of the engagement holes passes through the protrusion. and may extend in the second direction.

According to this aspect, the rigidity of the pair of side walls can be improved by the protrusion.

In the above aspect, one of the second portions may be offset in the first direction with respect to the other of the second portions.

According to this aspect, the screw member can be brought into contact with the second portion.

In the above aspect, each of the pair of second portions may have the same length in the second direction.

According to this aspect, the shape of the engagement hole can be simplified.

Another aspect of the invention is a vehicle seat having the above electric slide rail, wherein the rail is coupled to the floor of the vehicle and the slider is coupled to a seat cushion.

According to this aspect, it is possible to provide a vehicle seat including an electric slide rail that can suppress fluctuations in the contact position between the screw member and the engagement hole.

Another aspect of the present invention is a method for manufacturing an electric slide rail 1, wherein the electric slide rail includes a rail (11 having a groove-shaped cross section and extending along a first direction; a screw assembly (35 including a slider 12 received in and slidably engaged with the rail; and a screw member 38 supported on the slider for rotation about the first direction. an electric motor 36 supported by the slider and rotating the screw member; and a screw engagement portion 57 extending in the first direction and formed on the rail so as to engage with the screw member. The rail has a pair of side walls 17 facing each other, and the screw engaging portion is formed on each of the pair of side walls, and the screw engaging portion is formed in a plurality of screws arranged in the first direction. each of the engagement holes extends obliquely with respect to a second direction perpendicular to the first direction, and has a first portion 61 disposed at the center in the longitudinal direction. A pair of second portions 62A, 62B are disposed on both sides of the first portion, the width of each of the second portions in the first direction is equal to the width of the second portion of the first portion, the width in one direction, the screw member does not abut the edge 65 of the engagement hole in the first portion, and does not abut the edge 65 of the engagement hole in at least one of the second portions. The manufacturing method includes the steps of forming a plurality of the engagement holes in the rail, assembling the screw assembly and the electric motor on the slider, and assembling the screw assembly and the electric motor. and assembling the slider to the rail.

According to this aspect, it is possible to provide a method for manufacturing an electric slide rail that can suppress fluctuations in the contact position between the screw member and the engagement hole.

Other aspects of the present disclosure provide a slide rail and a method for manufacturing the slide rail that can reduce the load that may be applied to a harness to be connected to an electrical component provided on a slidably movable support.

One such aspect of the present disclosure is a slide rail 1 for slidably connecting a support 7 provided with an electrical component 67 to a floor 3, the slide rail 1 being provided on the floor 3. a slider 12 that is slidably engaged with the rail and supports the support body; a harness 202 to be connected to the electrical component; a cylindrical protector 212 connected to each other and through which the harness is inserted; the protector has one side perpendicular to the extending direction and the other side opposite to the one side. The protector is configured to be bendable and deformable, and the protector has a plurality of slits 220 for restricting the bending radius toward the one side to be equal to or larger than a predetermined threshold value (Rth).

According to this aspect, the bending radius when the protector into which the harness is inserted is bent to one side is limited to be equal to or greater than a predetermined threshold. Therefore, the bending radius of the harness when bent to one side can be limited, and the load that may be applied to the harness can be reduced.

In the above aspect, preferably, the width of each of the slits increases toward the one side.

According to this aspect, the protector is configured to be bendable to one side, and the bending radius when bent to one side can be limited to a predetermined threshold value or more.

In the above aspect, each of the slits has a triangular shape when viewed from above of the protector.

According to this aspect, the protector is configured to be bendable to one side, and the bending radius when bent to one side can be limited to a predetermined threshold value or more.

The above aspect includes a storage space 205 that stores a portion of the harness and the protector, and an entrance hole 206 communicating with the storage space and through which the harness and the protector pass. It includes a storage case 203.

According to this aspect, the harness and protector can be stored in the storage case.

In the above aspect, the protector is arranged in the storage space so as to be bent to the one side and the other side to form an S-shape, and the extending direction of the protector is arranged in the storage space to the other side. A guide wall is provided to guide the bending to the side.

According to this aspect, the harness and the protector can be well stored in the storage space, and the bending radius of the protector to the other side can be limited by the guide wall.

In the above aspect, the entrance hole of the storage case is connected to an end of the rail, and the protector and the harness protrude into the inside of the rail from the end of the rail.

According to this aspect, the protector and the harness can be stored within the rail.

In the above aspect, preferably, the outer surface of the protector is provided with a protrusion 224 that protrudes outward along the extending direction of the protector.

According to this aspect, the contact area between the protector and the rail can be reduced.

According to this aspect, it is possible to more reliably reduce the contact area between the protector and the rail.

In the above aspect, the protector is connected to the slider via a coupling member 240, and the coupling member is provided with a through hole 265 through which the harness passes, and the through hole is connected to the slider through a coupling member 240. The coupling member is open on the support side surface, and a cylindrical portion 267 is connected to the opening on the support side of the through hole.

According to this aspect, the extending direction of the harness can be guided toward the support body by the cylindrical portion.

In the above aspect, the support body includes a seat cushion 5 connected to the slider, and a seat back 6 extending upward from a rear part of the seat cushion.

According to this aspect, the seat body including the seat cushion and the seat back can be slidably connected to the floor.

In order to solve the above problems, an embodiment of the present invention provides a slide rail 1 for slidably connecting a support 7 provided with an electrical component 67 to a floor 3. A method of manufacturing this aspect may include assembling a rail device 275 including a rail 11 and a slider 12 slidably supported by the rail on the floor; and assembling the support body on the slider. This method may also include a step of connecting a cylindrical protector 212 housing a harness 202 to be connected to the electrical component to the slider, one side perpendicular to the extending direction of the protector. The protector is configured to be bendable and deformable in a direction opposite to the one side, and the protector includes a plurality of units for restricting the bending radius toward the one side to be equal to or larger than a predetermined threshold (Rth). A slit is formed extending from the one side toward the other side.

According to this aspect, the bending radius when the protector into which the harness is inserted is bent to one side is limited to be equal to or greater than a predetermined threshold. Therefore, the bending radius of the harness when bent to one side can be limited, and the load that may be applied to the harness can be reduced.

According to another aspect of the present disclosure, an electric slide rail 1 includes a rail 11 having a groove-shaped cross section and extending along a first direction; a screw assembly 35 including a slider 12 slidably engaged, a screw member 38 rotatably supported on the slider about the first direction; an electric motor 36 for rotating the member; and a threaded engagement portion 57, 58 extending in the first direction and formed on the rail so as to engage with the threaded member. The rail has a pair of side walls 17 facing each other, and the screw engagement portion has a plurality of engagement holes 59 formed in each of the pair of side walls and arranged in the first direction. Each of the engagement holes extends obliquely with respect to a second direction perpendicular to the first direction, and includes a first portion 61 disposed at the center in the longitudinal direction. A pair of second portions 62A, 62B are arranged on both sides, and the width of each of the second portions in the first direction is smaller than the width of the first portion in the first direction. The screw member does not contact the edge 65 of the engagement hole in the first portion, but contacts the edge of the engagement hole in at least one of the second portions.

According to this aspect, the screw member does not contact the edge of the engagement hole in the first portion, but contacts the edge of the engagement hole in at least one of the second portions, so that the screw member and the engagement hole do not come into contact with each other. The contact position is limited. Thereby, it is possible to provide an electric slide rail that can suppress fluctuations in the contact position between the screw member and the engagement hole.

In the above aspect, the screw member may abut the edge at one of the second portions.

According to this aspect, the contact position between the screw member and the engagement hole is further limited. Thereby, fluctuations in the contact position between the screw member and the engagement hole can be suppressed.

In the above aspect, the screw member may abut on the edge of one of the second portions in the first direction.

According to this aspect, when the screw member pushes the edge of the engagement hole, other parts of the screw member are prevented from coming into contact with the edge of the engagement hole.

In the above aspect, the edge of the engagement hole may have a step 65A at the boundary between the first portion and the second portion.

According to this aspect, contact between the first portion and the screw member is suppressed.

In the above aspect, a gap may be formed within the edge between the edge 65G forming the end of the second portion in the second direction and the screw member.

According to this aspect, because contact between the screw member and the end edge portion is suppressed, the generation of abnormal noise is suppressed and rotational resistance of the screw member is reduced.

In the above aspect, the edge portion may extend parallel to the first direction. According to this aspect, the shape of the engagement hole can be simplified.

In the above aspect, the pair of side walls are formed with protrusions 22 that protrude toward each other and extend in the first direction, and each of the engagement holes passes through the protrusion. and may extend in the second direction.

According to this aspect, the rigidity of the pair of side walls can be improved by the protrusion.

In the above aspect, one of the second portions may be offset in the first direction with respect to the other of the second portions.

According to this aspect, the screw member can be brought into contact with the second portion.

In the above aspect, each of the pair of second portions may have the same length in the second direction.

According to this aspect, the shape of the engagement hole can be simplified.

Another aspect of the present disclosure includes a vehicle seat including the above electric slide rail, wherein the rail is coupled to a floor of the vehicle and the slider is coupled to a seat cushion.

According to this aspect, it is possible to provide a vehicle seat including an electric slide rail that can suppress fluctuations in the contact position between the screw member and the engagement hole.

Another aspect of the present disclosure is a method for manufacturing an electric slide rail 1, wherein the electric slide rail includes a rail 11 having a groove-shaped cross section and extending along a first direction; a screw assembly 35 including a slider 12 received in and slidably engaged with the rail; and a screw member 38 supported on the slider for rotation about the first direction. an electric motor 36 supported by the slider and rotating the screw member; and a screw engagement portion 57 extending in the first direction and formed on the rail so as to engage with the screw member. The rail has a pair of side walls 17 facing each other, and the screw engaging portion is formed on each of the pair of side walls, and the screw engaging portion is formed in a plurality of screws arranged in the first direction. Each of the engagement holes extends obliquely with respect to a second direction perpendicular to the first direction, and has a first portion 61 disposed at the center in the longitudinal direction. A pair of second portions 62A, 62B is disposed on both sides of the first portion, the width of each of the second portions in the first direction is equal to the width of the second portion of the first portion. A to the width in one direction, the screw member does not abut the edge 65 of the engagement hole in the first portion, and does not abut the edge 65 of the engagement hole in at least one of the second portions. The manufacturing method includes the steps of forming a plurality of the engagement holes in the rail, assembling the screw assembly and the electric motor on the slider, assembling the screw assembly and the electric motor, and assembling the slider to the rail.

According to this aspect, it is possible to provide a method for manufacturing an electric slide rail that can suppress fluctuations in the contact position between the screw member and the engagement hole.

BRIEF EXPLANATION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION OF THE DRAWINGS

Figure 1:
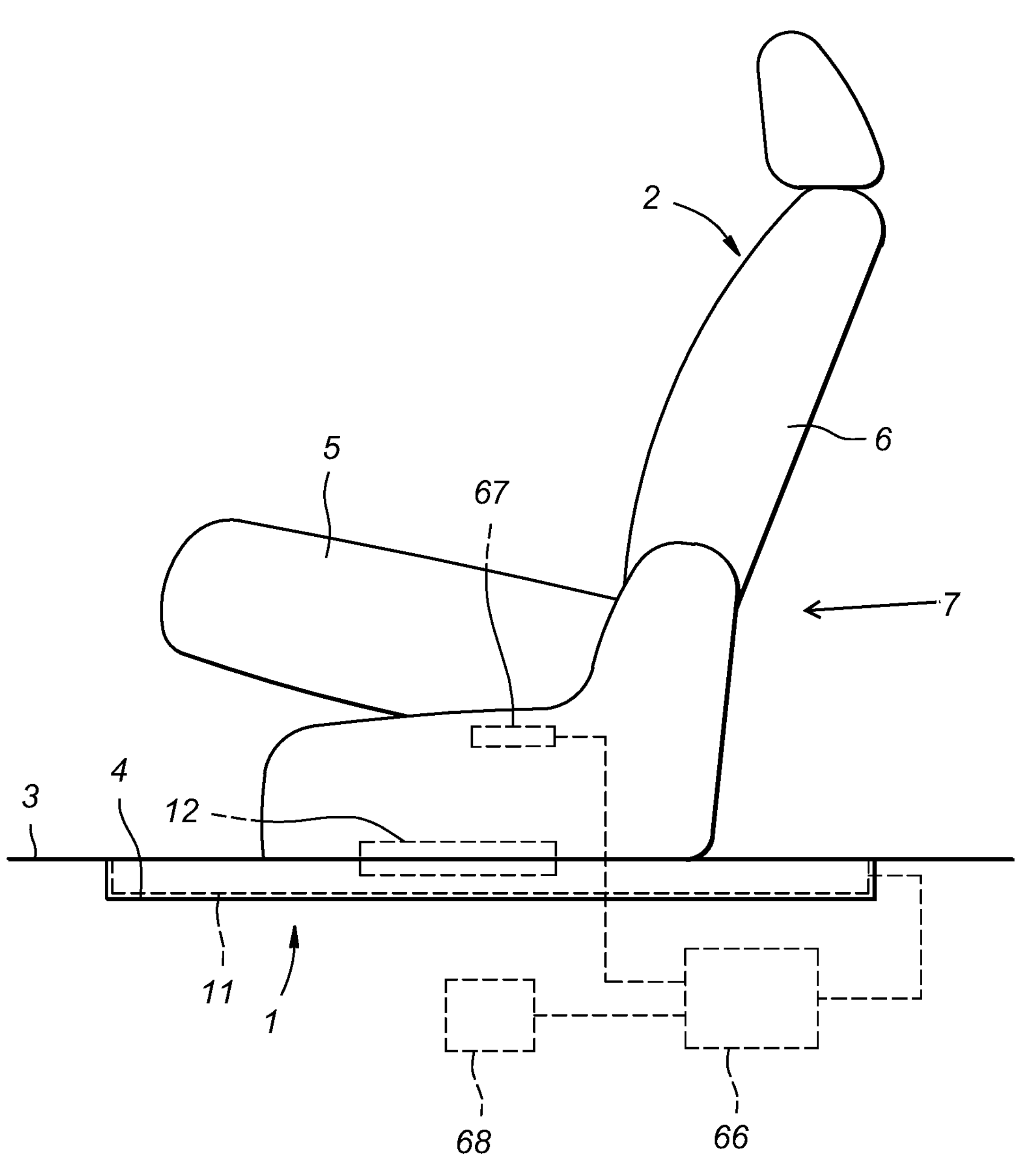
FIG. 1 schematically depicts a configuration of a vehicle seat equipped with an electric slide rail, according to one or more embodiments.

Embodiments of the present disclosure will be described below with reference to the drawings. Like elements in the various figures may be denoted by similar reference numerals for consistency. Further, in the following detailed description of embodiments of the present disclosure, numerous specific details are set forth in order to provide a more thorough understanding of the claimed subject matter. However, the embodiments disclosed herein may be practiced without these specific details. Additionally, it will be apparent that the scale of the elements presented in the accompanying figures may vary without departing from the scope of the present disclosure. Shapes and/or dimensions shown in the figures are for example, and other shapes and/or dimensions may be used and remain within the scope of the present disclosure, unless specified otherwise.

An electric slide rail includes a rail and a slider that is slidable relative to the rail. The rail is coupled to the first structure and the slider is coupled to the second structure. Movement of the slider relative to the rail causes the motorized slide rail to move the second structure relative to the first structure. The electric slide rail is provided, for example, between a floor and a seat of a vehicle, and moves the seat relative to the floor. Moreover, the electric slide rail is provided between the base and the work holder, and moves the work holder with respect to the base.

Hereinafter, embodiments of an electric slide rail 1 and a vehicle seat 2 provided with the electric slide rail I will be described with reference to the drawings. As shown in FIG. 1, the vehicle seat 2 has at least one electric slide rail 1 in its lower part, and is connected to the floor 3 of the vehicle at the electric slide rail 1. The vehicle seat 2 includes a seat cushion 5 that supports the buttocks of an occupant, and a seat back 6 that extends upward from the rear of the seat cushion 5 and supports the back of the occupant. The electric slide rail 1 is provided between the floor 3 and the seat cushion 5, and supports the seat cushion 5 so as to be slidable relative to the floor 3. As shown, the vehicle seat 2 also includes a pair of electric slide rails 1.

Hereinafter, a portion of the vehicle seat 2 that slides relative to the floor 3 by driving the electric slide rail I will be referred to as a seat body 7. The seat body 7 includes a seat cushion 5 and a seat back 6. The seat body 7 may further include a headrest provided on the upper part of the seat back 6 and an ottoman provided on the front side of the seat cushion 5.

Figure 2:
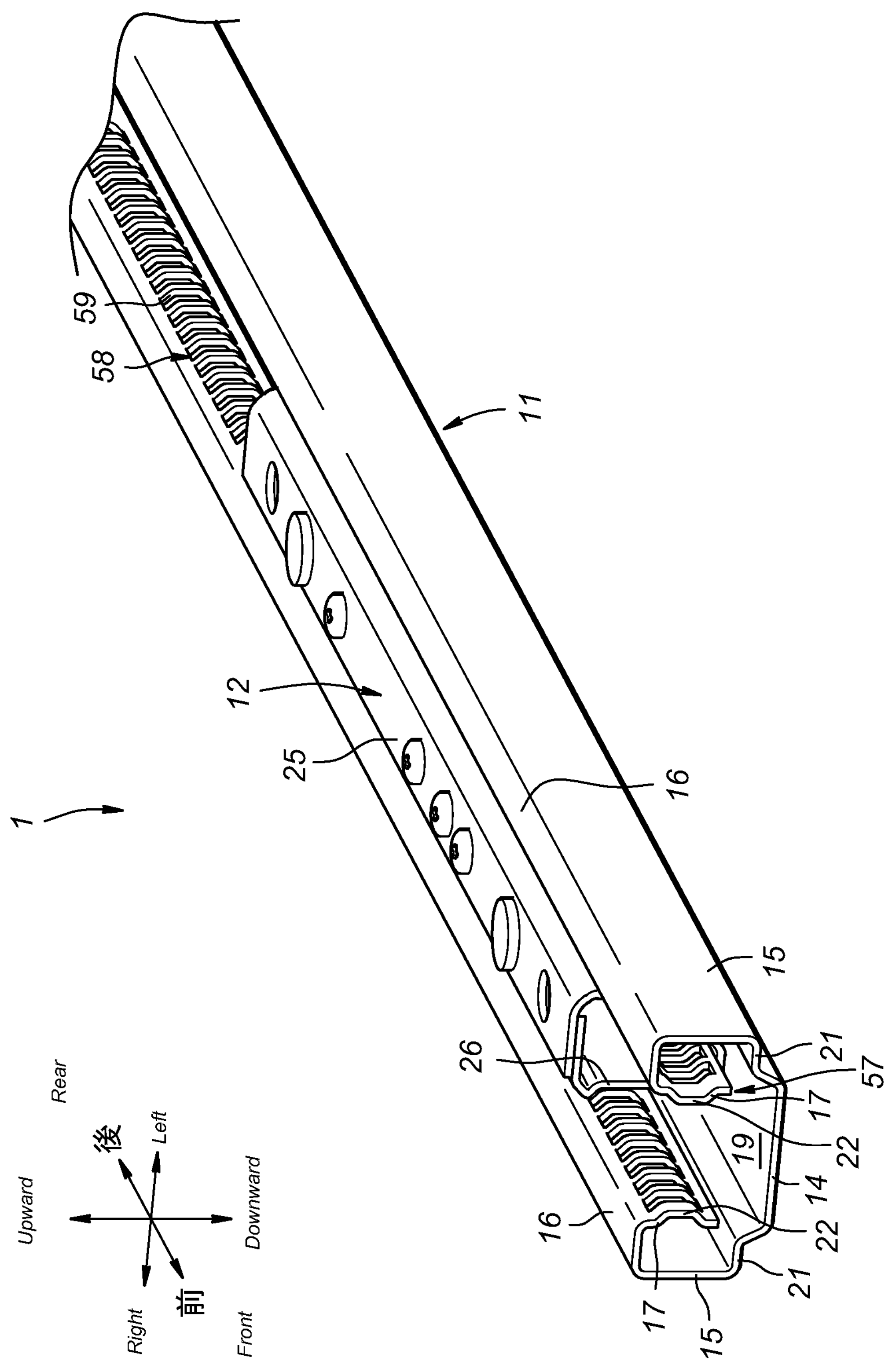
FIG. 2 is a perspective view of an electric slide rail, according to one or more embodiments.

As shown in FIG. 2, the electric slide rail 1 includes a rail 11 extending in the front-rear direction and a slider 12 that slidably engages with the rail 11. The extending direction of the rail 11 is defined as the front-rear direction. The extending direction of the rail 11 may or may not coincide with the longitudinal direction of the vehicle. That is, the extending direction of the rail 11 does not limit the mounting direction on the vehicle. In this embodiment, the extending direction of the rail 11 coincides with the longitudinal direction of the vehicle. In this embodiment, the slider 12 is provided above the rail 11. Therefore, the rail 11 may be referred to as a lower rail, and the slider 12 may be referred to as an upper rail.

Figure 3:
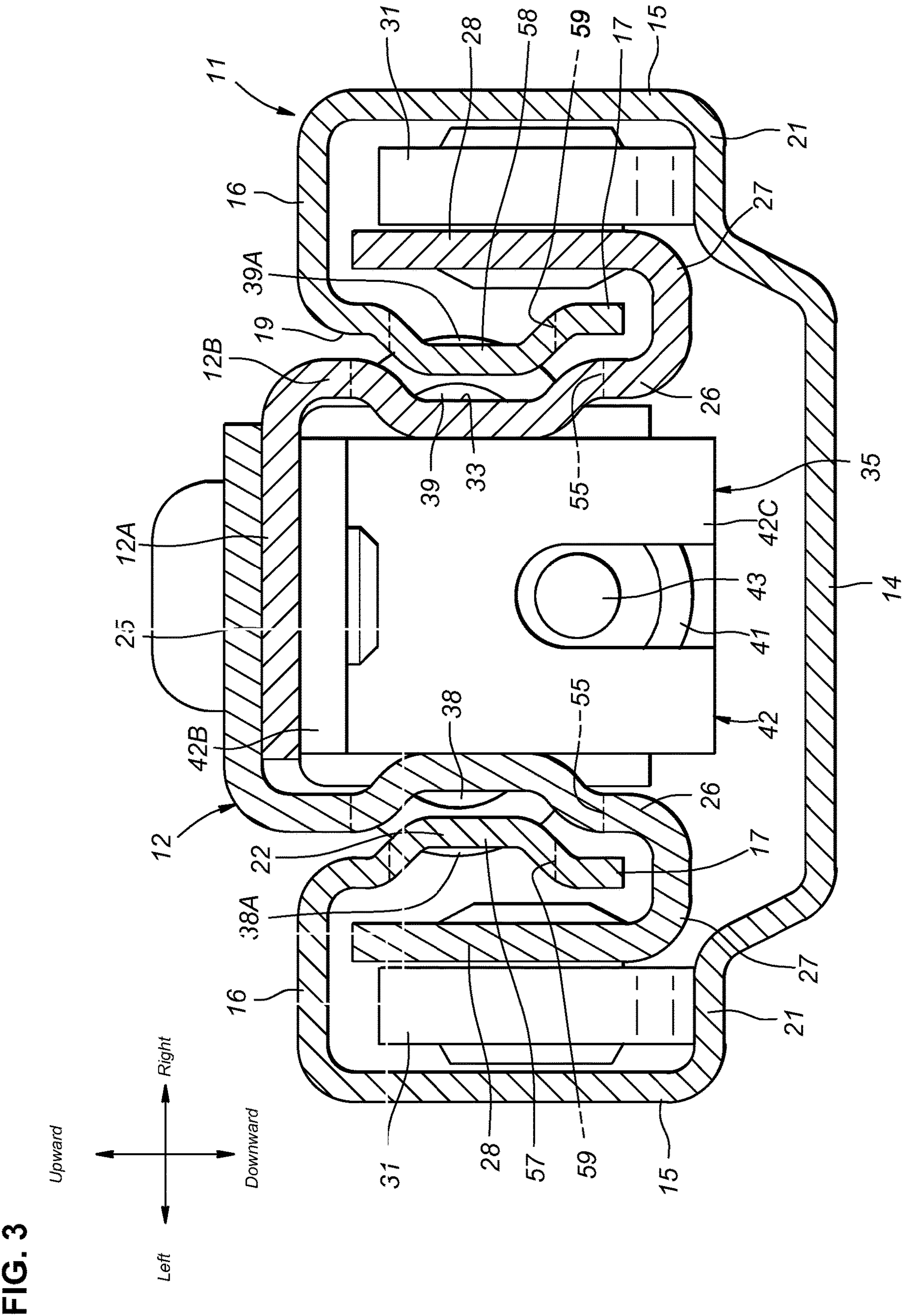
FIG. 3 is a cross-sectional view of the electric slide rail along section line III-III in FIG. 5.
Figure 4:
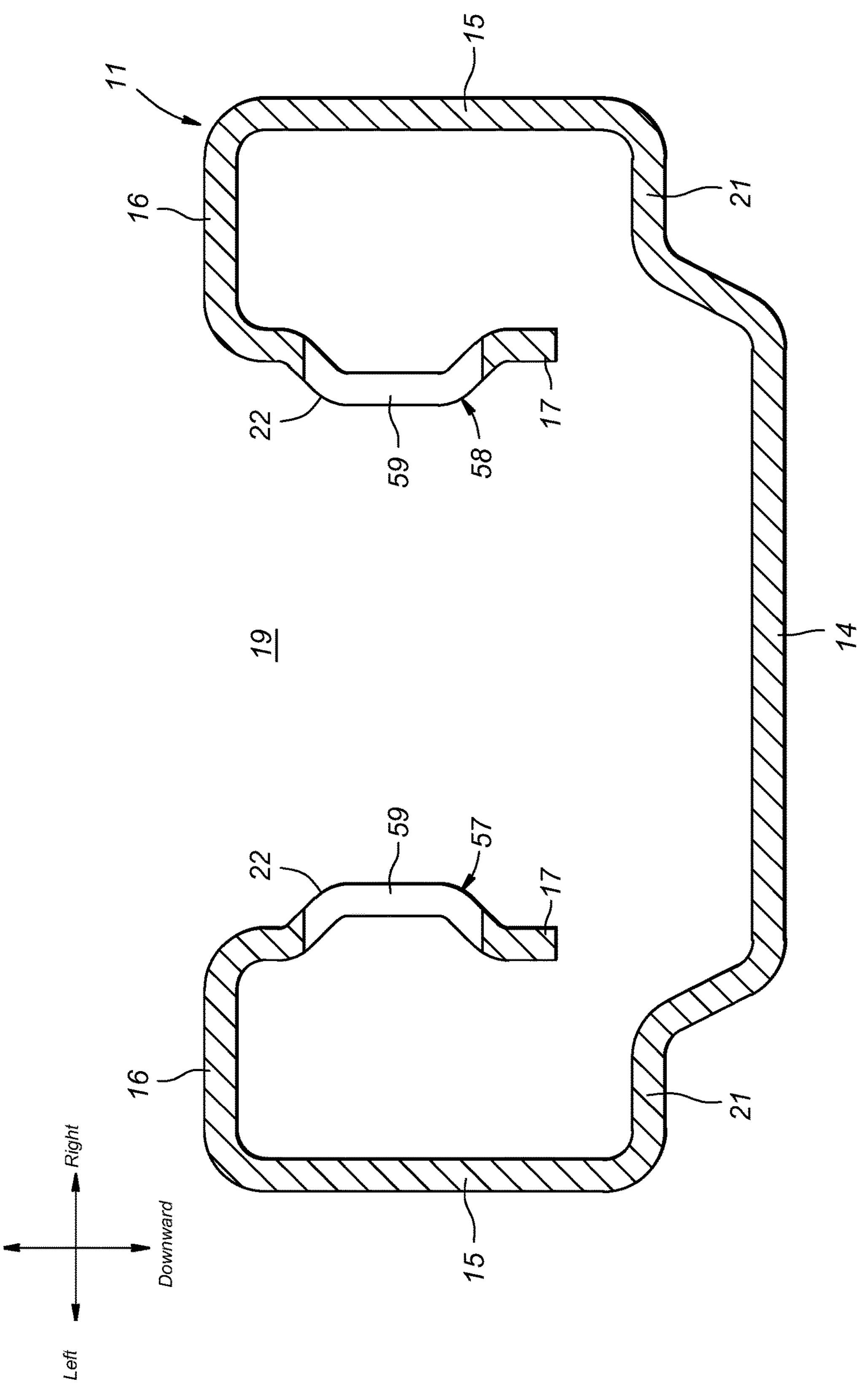
FIG. 4 is a cross-sectional view of the rail of the electric slide rail, according to one or more embodiments.

As shown in FIGS. 3 and 4, the rail 11 has a groove-shaped cross section. Specifically, the rail 11 includes a rail bottom wall 14 whose surfaces face upward and downward, left and right rail outer walls 15 extending upward from the left and right edges of the rail bottom wall 14 and whose surfaces face left and right, and left and right rail outer walls 15. Left and right rail upper walls 16 that extend toward each other from the upper end of the wall 15 and have surfaces facing up and down, and left and right rail inner walls that extend downward from the inner ends of the left and right rail upper walls 16 and have surfaces that face left and right.

The rail bottom wall 14, the left and right rail outer walls 15, the left and right rail upper walls 16, and the left and right rail inner walls 17 extend back and forth, respectively, in the front-rear direction. The left and right rail outer walls 15 and the left and right rail inner walls 17 extend parallel to each other and perpendicularly to the rail bottom wall 14. The lower ends of the left and right rail inner walls 17 are spaced apart from the rail bottom wall 14. The rail 11 has a rail opening 19 at its upper portion that extends back and forth. The rail opening 19 is defined by the left and right rail inner walls 17. The rail 11 is preferably formed by press-molding a metal plate. The left and right edge portions of the rail bottom wall 14 may have upwardly raised step portions 21. The left and right step portions 21 extend back and forth, and have flat upper surfaces.

Each of the left and right rail inner walls 17 is formed with a protrusion 22 that protrudes in a direction toward each other and extends in the front-rear direction. The cross sections of the left and right protrusions 22 are preferably formed in an arc shape or a trapezoid shape. Each protrusion 22 is disposed at an intermediate portion of the corresponding rail inner wall 17 in the vertical direction. The upper and lower ends of the left and right rail inner walls 17 are arranged laterally outward than the protrusion 22.

As shown in FIG. 3, the slider 12 is disposed at the opening end of the rail opening 19, and includes a plate-shaped base portion 25 whose surface faces upward and downward, and from the left and right side edges of the base portion 25 to the rail bottom wall 14 side, i.e. the left and right slider inner walls 26 extend downward, the left and right slider lower walls 27 extend outward from the lower ends of the left and right slider inner walls 26, and the left and right slider lower walls 27 extend upward from the left and right outer ends of the left and right slider lower walls 27 and a slider outer wall 28. The left and right slider inner walls 26 correspond to the third and fourth side walls in the claims. The base portion 25, the left and right slider inner walls 26, the left and right slider lower walls 27, and the left and right slider outer walls 28 extend back and forth.

The slider 12 is formed by fastening together a plurality of press-formed or roll-formed metal plates. In this embodiment, the slider 12 includes a first piece 12A and a second pieces 12B. The first piece 12A is a left slider and includes a base part 25, a left slider inner wall 26, a left slider lower wall 27, and a left slider outer wall 28. The second piece 12B is a right slider and includes a base part 25, a right slider inner wall 26, and a right slider lower wall 27. and a right slider outer wall 28. The slider 12 is formed by overlapping the first piece 12A and the second piece 12B with each other at their respective base portions 25 and fastening them. In other embodiments, slider 12 may be formed from a single sheet of press-formed or roll-formed metal. The longitudinal length of the slider 12 is set shorter than the longitudinal length of the rail 11. The slider 12 is coupled to the seat cushion 5 at the base portion 25.

The base portion 25 may be arranged above the left and right rail upper walls 16, or may be arranged below the left and right rail upper walls 16. The left and right slider inner walls 26 have surfaces facing left and right, and face each other at a distance from each other in the left and right directions. The left and right slider inner walls 26 are arranged between the left and right rail inner walls 17. Each slider inner wall 26 faces the corresponding rail inner wall 17 on the left and right with a gap interposed therebetween. Each slider lower wall 27 passes between the lower end of the rail bottom wall 14 and the corresponding inner wall of the rail 11 on the left and right, and extends left and right. The outer wall of each slider 12 is arranged between the corresponding rail outer wall 15 and rail inner wall 17 on the left and right. A plurality of wheels 31 are rotatably supported on the outer surface side of each slider outer wall 28 in the left-right direction. Each wheel 31 has a rotation axis that rotates in the left-right direction, and is in contact with the rail bottom wall 14. In this embodiment, each wheel 31 is in contact with the upper surface of the stepped portion 21 of the rail bottom wall 14. The slider 12 can smoothly slide relative to the rail 11 by being in contact with the rail 11 via the wheels 31. With the above configuration, the slider 12 is received by the rail 11 and slidably engaged with the rail 11. In other embodiments, the slider 12 may be supported by the rail 11 via ball or roller bearings.

The left and right slider inner walls 26 are formed with recesses 33 that are recessed toward each other and extend in the front-rear direction. A protrusion is formed on the back side of the recess 33 of the slider inner wall 26. The cross section of the left and right recesses 33 viewed from the front and back direction is formed in an arc shape or a trapezoid shape. Each recess 33 is disposed at an intermediate portion in the vertical direction in the corresponding slider inner wall 26. Each recess 33 is arranged at a position facing the corresponding protrusion 22 of the rail 11 on the left and right.

Figure 5:
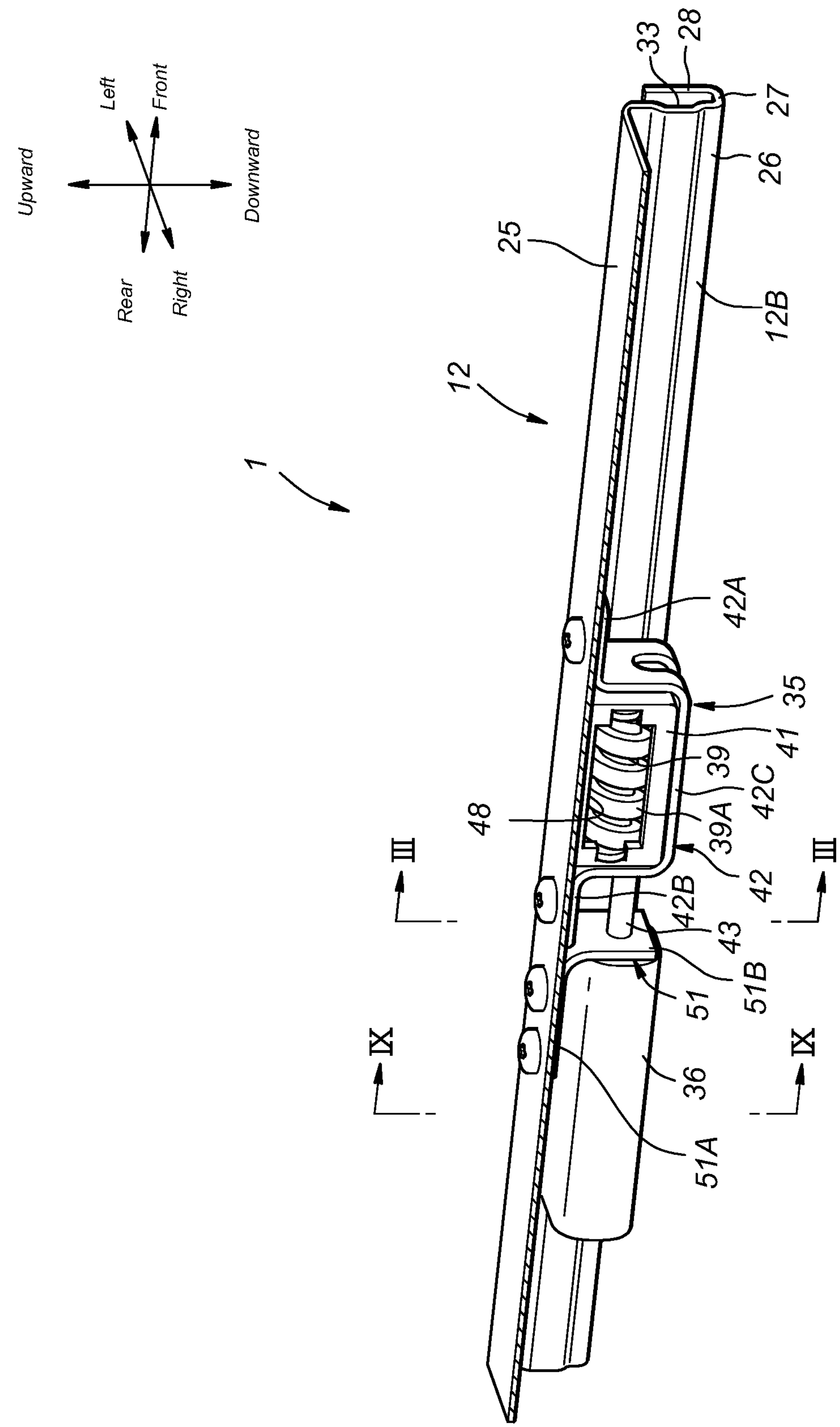
FIG. 5 is a partially cutaway perspective view of the slider, according to one or more embodiments.
Figure 6:
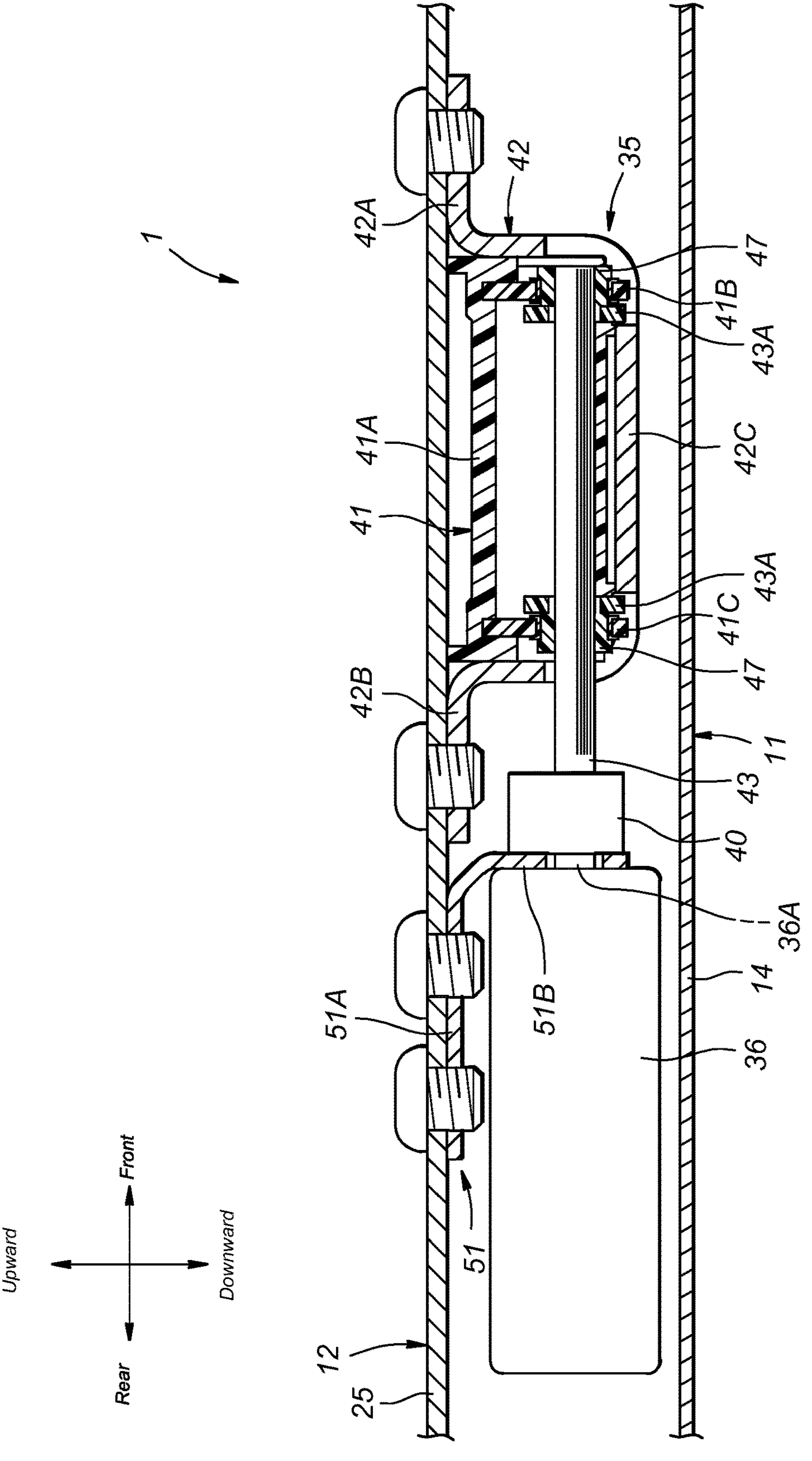
FIG. 6 is a cross-sectional view of electric slide rail, according to one or more embodiments.

The slider 12 is formed by a base portion 25 and left and right slider inner walls 26 into a groove shape that opens toward the rail bottom wall 14 side, that is, toward the bottom. As shown in FIGS. 5 and 6, a screw assembly 35 and an electric motor 36 are supported on the lower surface of the base portion 25. The screw assembly 35 includes screw members 38 and 39 that are rotatably supported by the slider 12 in the front-rear direction. The electric motor 36 is supported by the slider 12 and rotates the screw members 38 and 39.

Figure 8:
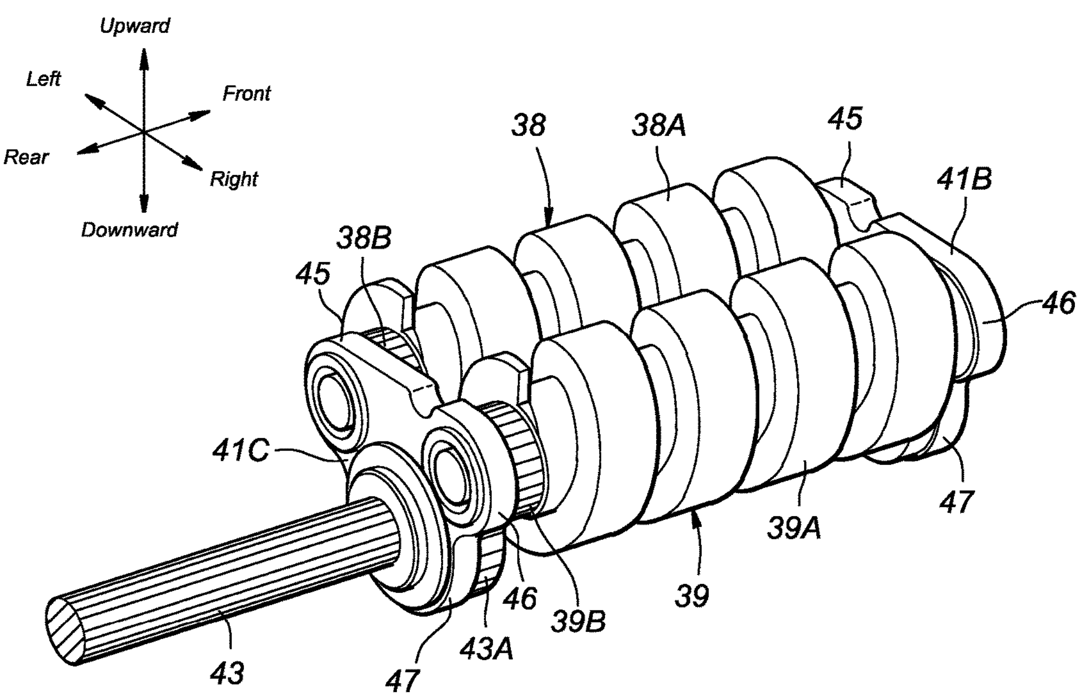
FIG. 8 is a perspective view of the screw assembly with the first bracket and outer case omitted, according to one or more embodiments.

As shown in FIG. 8, in this embodiment, the screw members 38 and 39 include a first screw member 38 and a second screw member 39. In other embodiments, screw assembly 35 may have a single screw member. The first screw member 38 and the second screw member 39 have screw threads 38A and 39A on the outer circumferential surface of the intermediate portion in the longitudinal direction. The number of screw threads 38A and 39A is determined by the size of the electric slide rail 1 and the required strength of the electric slide rail 1 in the longitudinal direction. For example, if it is desired to increase the required strength, the number of threads 38A, 39A may be increased. As shown in FIGS. 5 and 6, the screw assembly 35 includes a gear case 41 that rotatably supports a first screw member 38 and a second screw member 39, and a first bracket 42 that supports the gear case 41 on the slider 12. and has.

Figure 7:
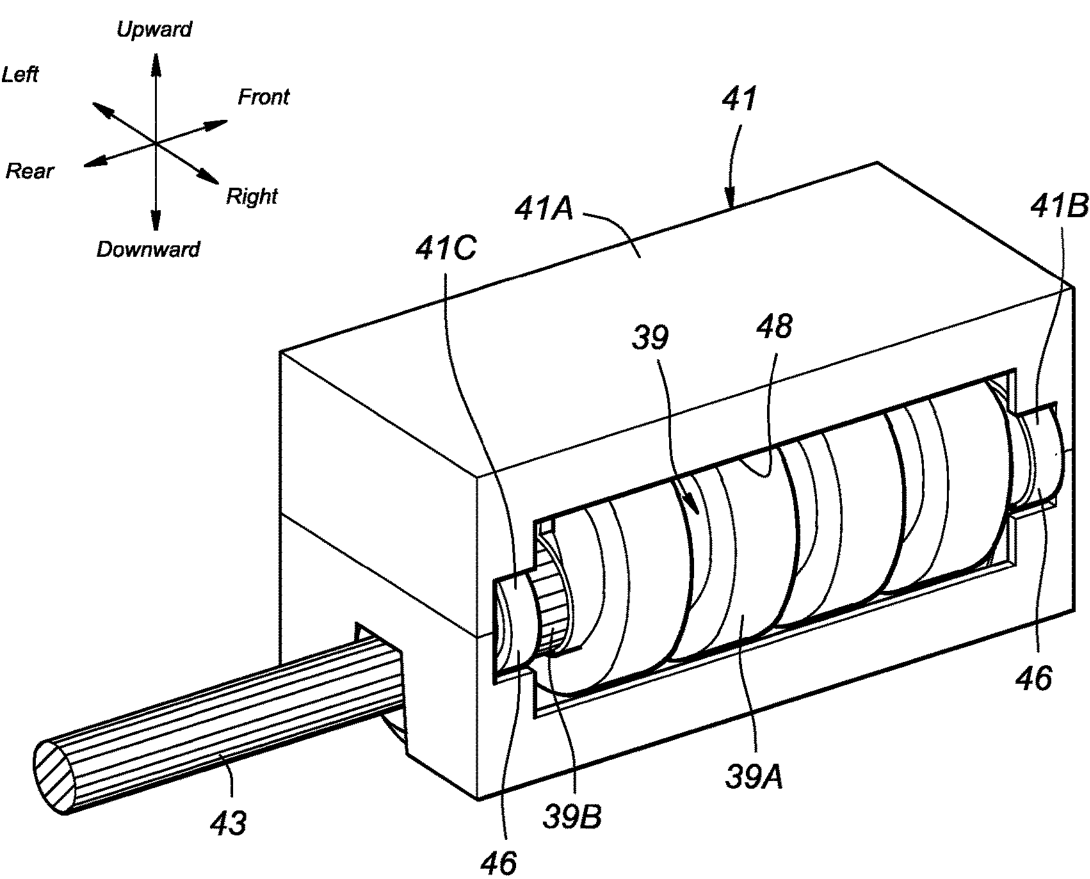
FIG. 7 is a perspective view of the screw assembly with the first bracket omitted, according to one or more embodiments.

As shown in FIGS. 7 and 8, the gear case 41 is formed in the shape of a rectangular parallelepiped box that is long from front to back. The gear case 41 rotatably supports the first screw member 38, the second screw member 39, and a drive shaft 43 connected to the rotation shaft 36A of the electric motor 36. The first screw member 38, the second screw member 39, and the drive shaft 43 each extend back and forth and are arranged in parallel to each other in the gear case 41. The gear case 41 includes a box-shaped outer case 41A forming an outer shell, and a front support member 41B and a rear support member 41C supported at the front and rear ends of the outer case 41A. The front support member 41B and the rear support member 41C include a pair of front and rear first bearings 45 that rotatably support the front and rear ends of the first screw member 38, and a pair of front and rear first bearings 45 that rotatably support the front and rear ends of the second screw member 39. A pair of front and rear second bearing portions 46 that rotatably support the drive shaft 43 and a pair of front and rear third bearing portions 47 that rotatably support the drive shaft 43 are provided.

The first screw member 38 is arranged along the left side of the gear case 41, and the second screw member 39 is arranged along the right side of the gear case 41. The drive shaft 43 is arranged below an intermediate portion between the first screw member 38 and the second screw member 39. The drive shaft 43 has a drive gear 43A within the gear case 41. The first screw member 38 has a first gear 38B that meshes with the drive gear 43A. The second screw member 39 has a second gear 39B that meshes with the drive gear 43A. Each of the drive gear 43A, the first gear 38B, and the second gear 39B may be a spur gear. When the drive shaft 43 rotates, the first screw member 38 and the second screw member 39 rotate in the same direction. The first gear 38B and the second gear 39B may be symmetrical.

As shown in FIGS. 5 and 6, the gear case 41 has a case opening 48 that is an opening for laterally exposing the first screw member 38 and the second screw member 39. The thread 38A of the first screw member 38 passes through a case opening 48 formed on the left side of the gear case 41 and projects to the left. Similarly, the thread 39A of the second screw member 39 passes through a case opening 48 formed on the right side of the gear case 41 and projects to the right. Case opening 48 is formed in outer case 41A.

The first bracket 42 extends back and forth and has a first coupling part 42A provided at the front end and a second coupling part 42B provided at the rear end. The first bracket 42 is coupled to the lower surface of the base portion 25 of the slider 12 at a first coupling portion 42A and a second coupling portion 42B. The first bracket 42 has a support section 42C extending from the first coupling section 42A to the second coupling section 42B. The first bracket 42 is an integral metal member including a first coupling part 42A, a second coupling part 42B, and a support part 42C. The support portion 42C has a portion located below the first joint portion 42A and the second joint portion 42B. The first bracket 42 cooperates with the base part 25 to form a closed structure by the support part 42C. The gear case 41 is arranged between the base portion 25 of the slider 12 and the support portion 42C. The first bracket 42 is formed by bending a metal plate. The first coupling portion 42A extends forward from the front portion of the gear case 41, and the second coupling portion 42B extends rearward from the rear portion of the gear case 41. The first coupling portion 42A and the second coupling portion 42B are fastened to the base portion 25 by a fastening member such as a screw or a rivet. The distance between the fastening points of the first coupling part 42A and the second coupling part 42B is set to be longer than the longitudinal length of the gear case 41.

A second bracket 51 for supporting the electric motor 36 on the base portion 25 of the slider 12 is provided behind the first bracket 42. The second bracket 51 has a coupling part 51A coupled to the base part 25, and a support part 51B extending from the coupling part 51A to the side opposite to the base part 25, that is, downward. The support portion 51B is perpendicular to the coupling portion 51A, and the second bracket 51 is formed in an L shape. The electric motor 36 is coupled to the support portion 51B at one end thereof. In this embodiment, the electric motor 36 is disposed below the coupling portion 51A, and the second bracket 51 cantilever-supports the end of the electric motor 36 on the screw members 38 and 39 side.

The rear end of the drive shaft 43 protrudes rearward from the rear support member 41C of the gear case 41, passes through a through hole formed in the first bracket 42, and extends rearward. The rotating shaft 36A of the electric motor 36 is connected to the rear end of the drive shaft 43. The rotation shaft 36A and the drive shaft 43 are preferably coupled by a coupling. Further, the rotation shaft 36A and the drive shaft 43 may have a fitting portion that meshes with each other. The rotation shaft 36A of the electric motor 36 and the drive shaft 43 are arranged on the same straight line. The electric motor 36 is formed into a cylindrical shape and extends back and forth.

A reduction gear 40 or "speed reducer" may be provided between the rotating shaft 36A of the electric motor 36 and the drive shaft 43. The speed reducer 40 may be, for example, a planetary gear mechanism. The speed reducer 40 is preferably provided on the surface of the support portion 51B of the second bracket 51 on the side opposite to the electric motor 36. In other embodiments, the speed reducer 40 may be supported by the rear end surface of the gear case 41. The speed reducer 40 is an optional configuration and can be omitted.

The screw assembly 35, the electric motor 36, the first bracket 42, and the second bracket 51 are arranged below the base portion 25 and between the left and right slider inner walls 26. The left and right slider inner walls 26 have slider openings 55 at positions corresponding to the screw assemblies 35. The slider opening 55 is formed in the recess 33 of the slider inner wall 26. The left portion of the thread 38A of the first screw member 38 passes through the left case opening 48 of the gear case 41 and the slider opening 55 of the left slider inner wall 26, and projects to the left of the left slider inner wall 26. Similarly, the right part of the thread 39A of the second screw member 39 passes through the right case opening 48 of the gear case 41 and the slider opening 55 of the right slider inner wall 26 to the right of the right slider inner wall 26, and projects outward.

As shown in FIG. 2, the rail 11 is formed with screw engaging portions 57 and 58 that extend in the front-rear direction and engage with the screw members 38 and 39. The screw engaging portions 57 and 58 are formed on the left rail inner wall 17 and engage with the thread 38A of the first screw member 38, and the first screw engaging portion 57 is formed on the right rail inner wall 17 and engages with the thread 38A of the first screw member 38. A second screw engaging portion 58 that engages with the thread 39A of the second screw member 39 is provided. The first screw engaging portion 57 and the second screw engaging portion 58 are formed on the corresponding protrusion 22 of the rail inner wall 17. The first threaded engagement portion 57 and the second threaded engagement portion 58 include a plurality of engagement holes 59 formed in the protrusion 22 in parallel in the front-rear direction. The first threaded member 38 engages with the plurality of engagement holes 59 of the first threaded engagement portion 57 at the left side of the thread 38A of the first threaded member 38, and rotates around the front-rear direction to engage the first threaded engagement. It moves back and forth with respect to the section 57. Similarly, the second threaded member 39 engages with the plurality of engagement holes 59 of the second threaded engagement portion 58 at the right side of the thread 39A of the second threaded member 39, and rotates around the front-rear direction, thereby forming the second threaded member 39. It moves back and forth with respect to the screw engagement part 58.

The electric slide rail 1 is controlled by a control device 66. The control device 66 is provided on the floor 3, for example. The control device 66 is an electronic control device and is connected to a power source 68 and an operation switch 67. The operation switch 67 has a button corresponding to forward movement and a button corresponding to backward movement. The control device 66 controls the direction and amount of rotation of the electric motor 36 based on a signal from the operation switch 67. Thereby, the operator can actuate the electric slide rail 1 by operating the operation switch 67 and move the vehicle seat 2 back and forth with respect to the floor 3.

Each rail 11 of the left and right electric slide rails 1 is coupled to the floor 3 of the vehicle via a bracket or directly. Each rail 11 is preferably received in a rail groove 4 formed in the floor 3. The upper surface of the rail upper wall 16 of the rail 11 is preferably arranged on the same plane as the upper surface of the floor 3. By arranging the rail 11 in the rail groove 4, it is possible to suppress the rail 11 from protruding from the floor 3. Each slider 12 of the left and right electric slide rails 1 is coupled to a seat cushion 5. The sliders 12 of the left and right electric slide rails 1 may be connected to each other by a connecting member.

The rotation of the electric motor 36 is transmitted to the first screw member 38 and the second screw member 39 via the rotation shaft 36A, the drive shaft 43, the drive gear 43A, the first gear 38B, or the second gear 39B. As a result, the first screw member 38 and the second screw member 39 rotate in the same direction. When the first screw member 38 and the second screw member 39 rotate, the first screw member 38 and the second screw member 39 move back and forth with respect to the first screw engagement part 57 and the second screw engagement part 58, The slider 12 moves back and forth with respect to the rail 11.

Figure 9:
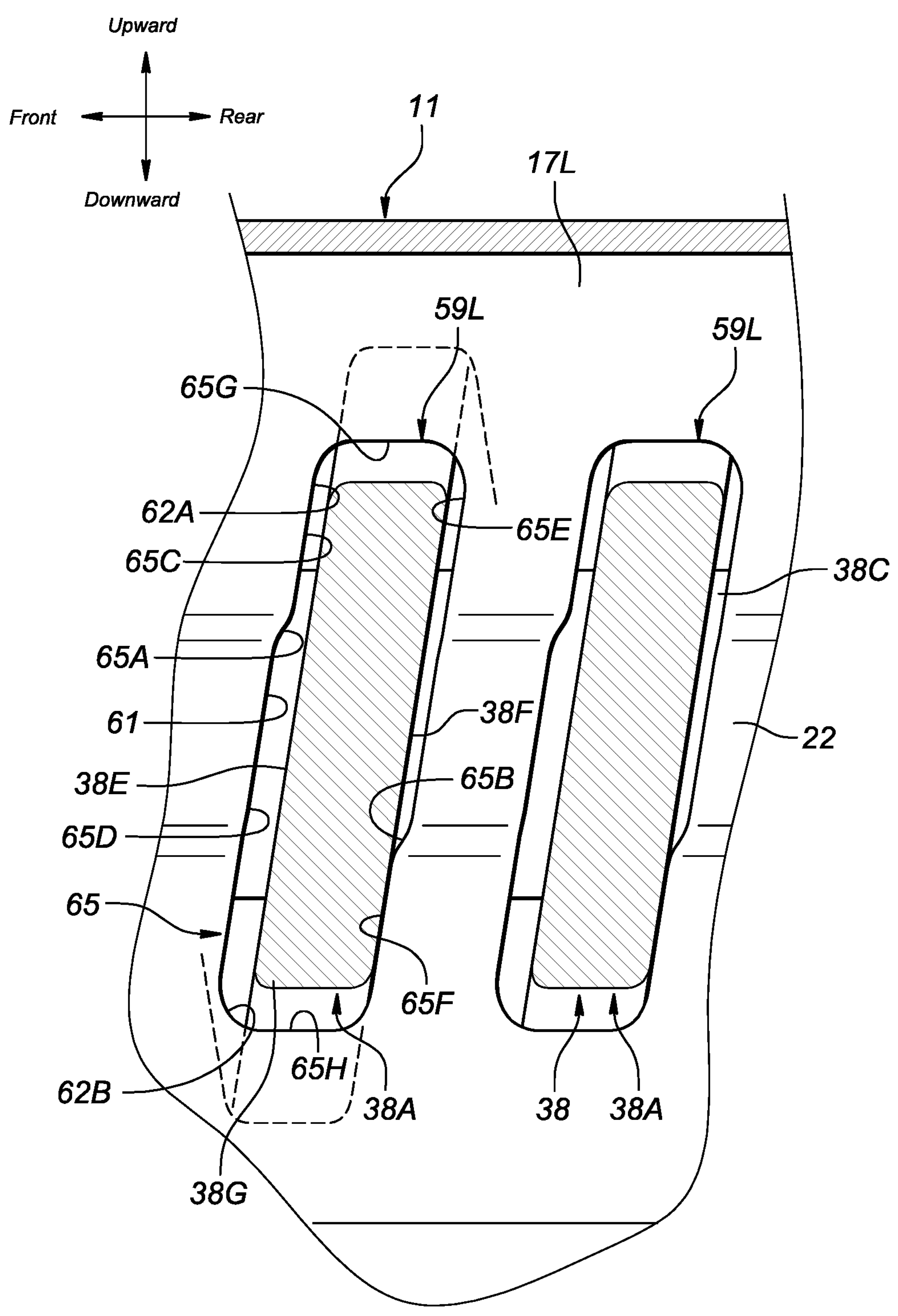
FIG. 9 is a cross-sectional view of the inside wall of the left rail, viewed from the left, according to one or more embodiments.

FIG. 9 is a sectional view of the left rail inner wall 17L viewed from the left. FIG. 9 shows a cross section perpendicular to the left-right direction and along the left side surface of the left rail inner wall 17L. A plurality of engagement holes 59L forming the first screw engagement portion 57 formed in the left rail inner wall 17L are arranged in the front-rear direction (first direction). Each of the engagement holes 59L extends obliquely with respect to the up-down direction (second direction) orthogonal to the front-rear direction. In this embodiment, each of the engagement holes 59L is inclined upward and rearward. Each of the engagement holes 59 is formed in the same shape and extends parallel to each other.

Each of the engagement holes 59L has a first portion 61 disposed at the center in the longitudinal direction and a pair of second portions 62A and 62B disposed on both sides of the first portion 61. Each of the engagement holes 59L has, in order from the top, an upper second portion 62A, a first portion 61, and a lower second portion 62B. The width of each of the second portions 62A, 62B in the front-rear direction (first direction) is smaller than the width of the first portion 61 in the first direction.

The edge 65 of the engagement hole 59L has stepped portions 65A, 65B at the boundary between the first portion 61 and the second portions 62A, 62B. The edge 65 includes an upper front edge 65C that constitutes the upper part of the front edge of the engagement hole 59L, a lower front edge 65D that constitutes the lower part of the front edge of the engagement hole 59L; and a rear edge of the engagement hole 59L includes a lower rear edge 65F that constitutes the lower part of the rear edge of the engagement hole 59L, an upper edge 65G that constitutes the upper edge of the engagement hole 59L, and an upper rear edge 65E that constitutes the upper part of the engagement hole 59L. In addition, the edge 65 includes a lower end edge 65H that constitutes the lower edge of 59L.

The stepped portion 65A is arranged between the upper front edge 65C and the lower front edge 65D. The lower front edge 65D is offset forward from the upper front edge 65C by the stepped portion 65A. The step portion 65B is arranged between the upper rear edge portion 65E and the lower rear edge portion 65F. The upper rear edge 65E is offset rearward from the lower rear edge 65F by the stepped portion 65B.

The upper front edge 65C, the lower front edge 65D, the upper rear edge 65E, and the lower rear edge 65F extend parallel to each other. The upper end edge 65G and the lower end edge 65H extend in the front-rear direction.

The upper front edge portion 65C forms the front edge of the upper second portion 62A. The lower front edge portion 65D forms the front edge of the first portion 61 and the lower second portion 62B. The upper rear edge portion 65E forms the rear edge of the upper second portion 62A and the first portion 61. The lower rear edge portion 65F forms the rear edge of the lower second portion 62B. The upper edge 65G forms the upper end of the upper second portion 62A. The lower end edge 65H forms the lower end of the lower second portion 62B.

Figure 10:
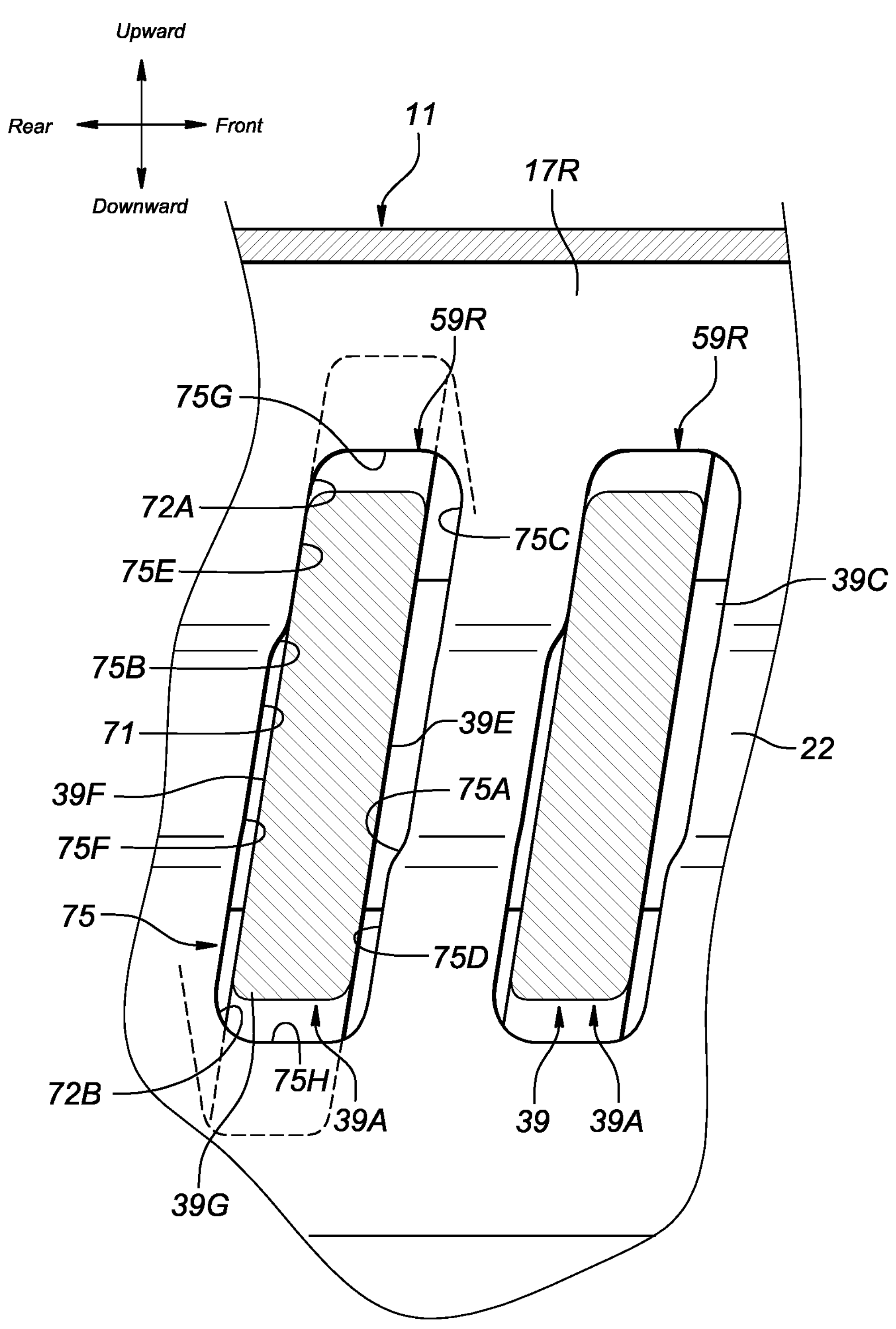
FIG. 10 is a cross-sectional view of the inner wall of the right rail, viewed from the right, according to one or more embodiments.

FIG. 10 is a side view of the right rail inner wall 17R viewed from the right. FIG. 10 shows a cross section perpendicular to the left-right direction and along the right side surface of the right rail inner wall 17R. A plurality of engagement holes 59R forming the second screw engagement portion 58 formed in the right rail inner wall 17R are arranged in the front-rear direction (first direction). Each of the engagement holes 59R extends obliquely with respect to the up-down direction (second direction) orthogonal to the front-rear direction. In this embodiment, each of the engagement holes 59R is inclined upward and rearward. Each of the engagement holes 59 is formed in the same shape and extends parallel to each other.

Each of the engagement holes 59R has a first portion 71 disposed at the center in the longitudinal direction and a pair of second portions 72A and 72B disposed on both sides of the first portion 71. Each of the engagement holes 59R has an upper second portion 72A, a first portion 71, and a lower second portion 72B in order from the top. The width of each of the second portions 72A, 72B in the front-rear direction (first direction) is smaller than the width of the first portion 71 in the first direction.

The edge 75 of the engagement hole 59R has stepped portions 75A and 75B at the boundary between the first portion 71 and the second portions 72A and 72B. The edge 75 includes an upper front edge 75C that constitutes the upper part of the front edge of the engagement hole 59R, a lower front edge 75D that constitutes the lower part of the front edge of the engagement hole 59R, and a rear edge of the engagement hole 59R. The rear edge of the engagement hole 59R includes an upper rear edge 75E that constitutes the upper part of the engagement hole 59R and a lower rear edge 75F that constitutes the lower part of the rear edge of the engagement hole 59R. The edge 75 also includes an upper end edge 75G that constitutes the upper edge of the engagement hole 59R and a lower end edge 75H that constitutes the lower edge of 59R.

The stepped portion 75A is arranged between the upper front edge 75C and the lower front edge 75D. The lower front edge 75D is offset rearward from the upper front edge 75C by the stepped portion 75A. The stepped portion 75B is arranged between the upper rear edge 75E and the lower rear edge 75F. The upper rear edge 75E is offset forward from the lower rear edge 75F by the stepped portion 75B.

The upper front edge 75C, the lower front edge 75D, the upper rear edge 75E, and the lower rear edge 75F extend parallel to each other. The upper end edge 75G and the lower end edge 75H extend in the front-rear direction.

The upper front edge portion 75C forms the front edges of the upper second portion 72A and the first portion 71. The lower front edge portion 75D forms the front edge of the lower second portion 72B. The upper rear edge portion 75E forms the rear edge of the upper second portion 72A. The lower rear edge portion 75F forms the rear edge of the first portion 71 and the lower second portion 72B. The upper end edge 75G forms the upper end of the upper second portion 62A. The lower end edge 75H forms the lower end of the lower second portion 62B.

Figure 11:
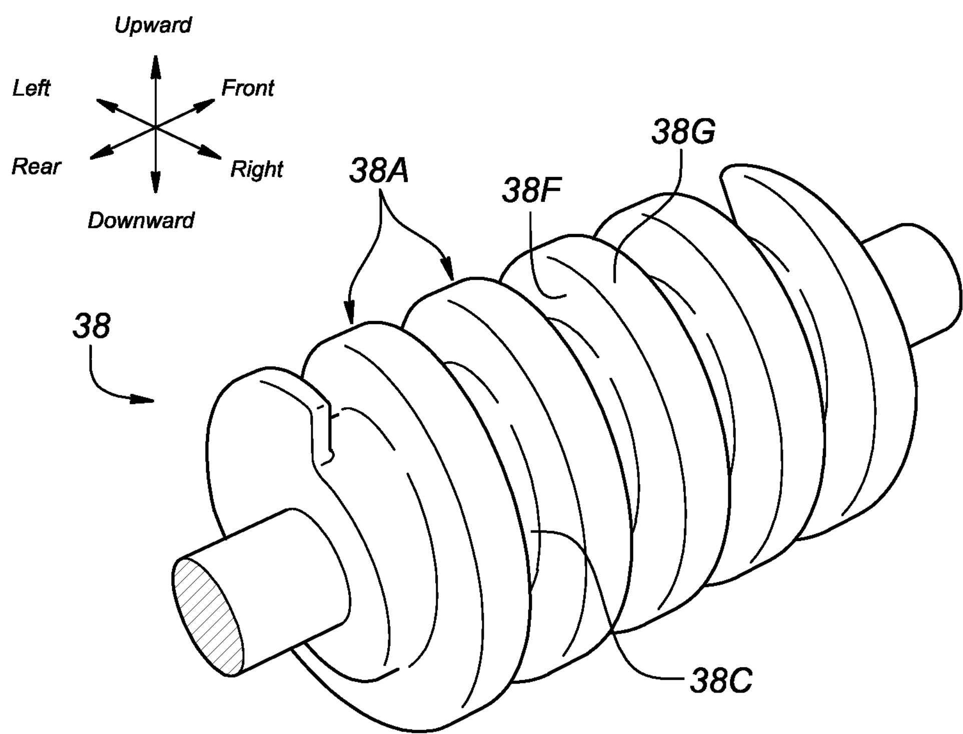
FIG. 11 is a perspective view of the first screw member, according to one or more embodiments.
Figure 12:
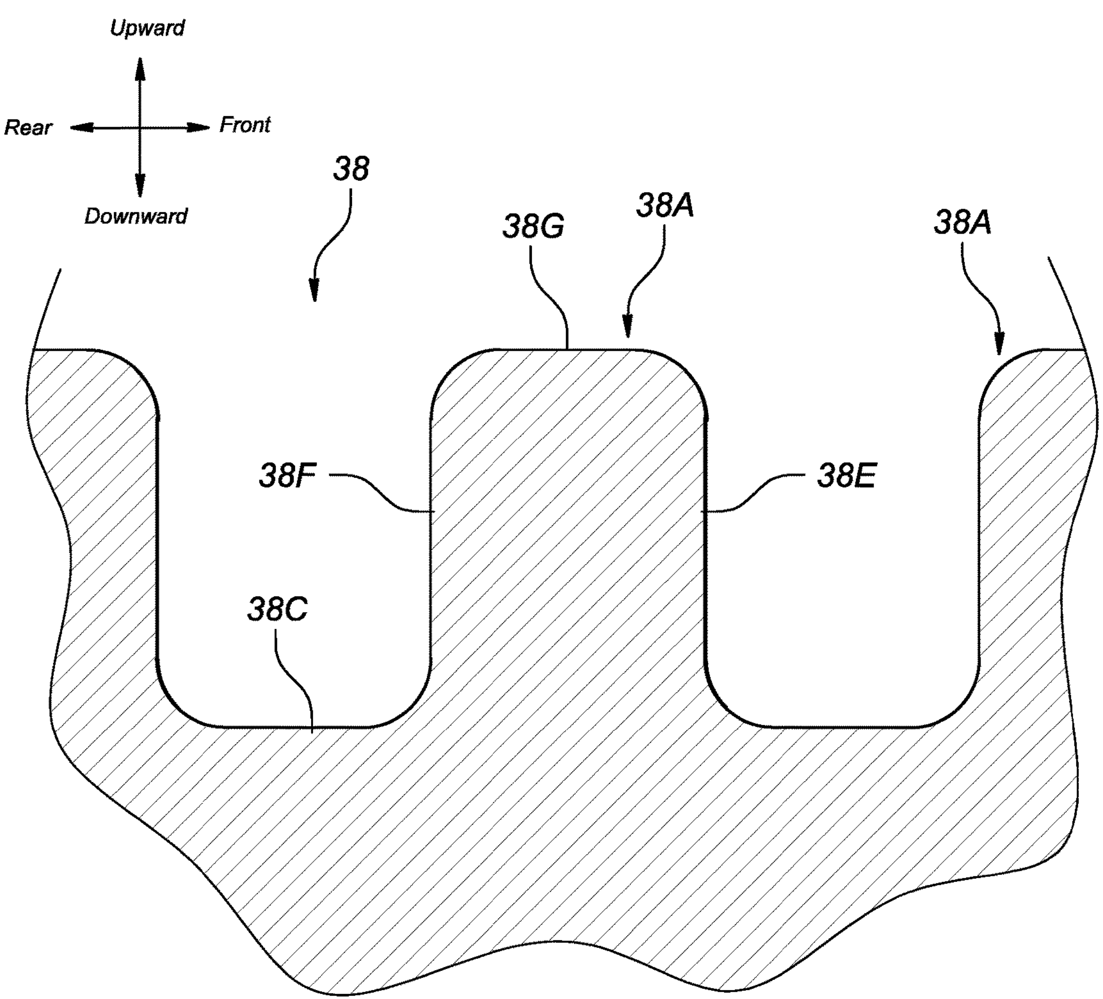
FIG. 12 is a cross-sectional view of the thread of the first screw member, according to one or more embodiments.

FIG. 11 is a perspective view of the first screw member 38. The first screw member 38 has a cylindrical shaft portion 38C extending in the front-rear direction. The thread 38A is spirally formed on the outer peripheral surface of the shaft portion 38C. In this embodiment, the thread 38A is a left-hand helix. FIG. 12 is a cross-sectional view of the thread 38A of the first screw member 38. The thread 38A has a front surface 38E, a rear surface 38F, and a top surface 38G. In the cross section of the thread 38A, the front side surface 38E and the rear side surface 38F extend substantially perpendicularly to the outer peripheral surface of the shaft portion 38C. In the cross section of the thread 38A, the top surface 38G extends parallel to the outer peripheral surface of the shaft portion 38C. The thread 38A has a rectangular cross-sectional shape. Like the first screw member 38, the second screw member 39 has a screw thread 39A, a shaft portion 39C, a front side surface 39E, a rear side surface 39F, and a top surface 39G.

The thread 38A of the first screw member 38 projects into a plurality of engagement holes 59L formed in the left rail inner wall 17L. As shown in FIG. 9, the first screw member 38 does not contact the edge 65 of the engagement hole 59L at the first portion 61, but engages at least one of the upper and lower second portions 62A and 62B. It abuts against the edge 65 of the hole 59L. Further, the first screw member 38 contacts the edge 65 at one of the upper and lower second portions 62A and 62B. Further, the first screw member 38 contacts the edge 65 at one side in the front-rear direction of one of the upper and lower second portions 62A, 62B.

In FIG. 9, the first screw member 38 rotates counterclockwise when viewed from the rear, and the rear surface 38F of the screw thread 38A abuts the lower rear edge 65F of the engagement hole 59L at the lower second portion 62B. At this time, a gap is formed between the rear surface 38F and the upper rear edge 65E of the thread 38A, and the rear surface 38F and the upper rear edge 65E do not come into contact with each other. Further, a gap is formed between the upper end edge 65G and the thread 38A of the first screw member 38. A gap is formed between the lower end edge 65H and the thread 38A of the first screw member 38.

Similarly, in FIG. 10, the second screw member 39 rotates clockwise when viewed from the rear, and the rear surface 39F of the thread 39A of the second screw member 39 hits and comes into contact with (i.e., engages) the upper rear edge 75E of the engagement hole 59R. At this time, the rear surface 39F of the thread 39A of the second screw member 39 does not come into contact with the lower rear edge 75F. Further, a gap is formed between the upper end edge 75G and the thread 39A of the second screw member 39. A gap is formed between the lower end edge 75H and the thread 39A of the second screw member 39.

The rear surface 38F of the thread 38A of the first screw member 38 pushes the lower rear edge 65F of the engagement hole 59L backward, and the rear surface 38F of the thread 39A of the second screw member 39 pushes the lower rear edge 65F of the engagement hole 59R. By pushing the upper rear edge 75E backward, the slider 12 moves forward with respect to the rail 11.

Figure 13:
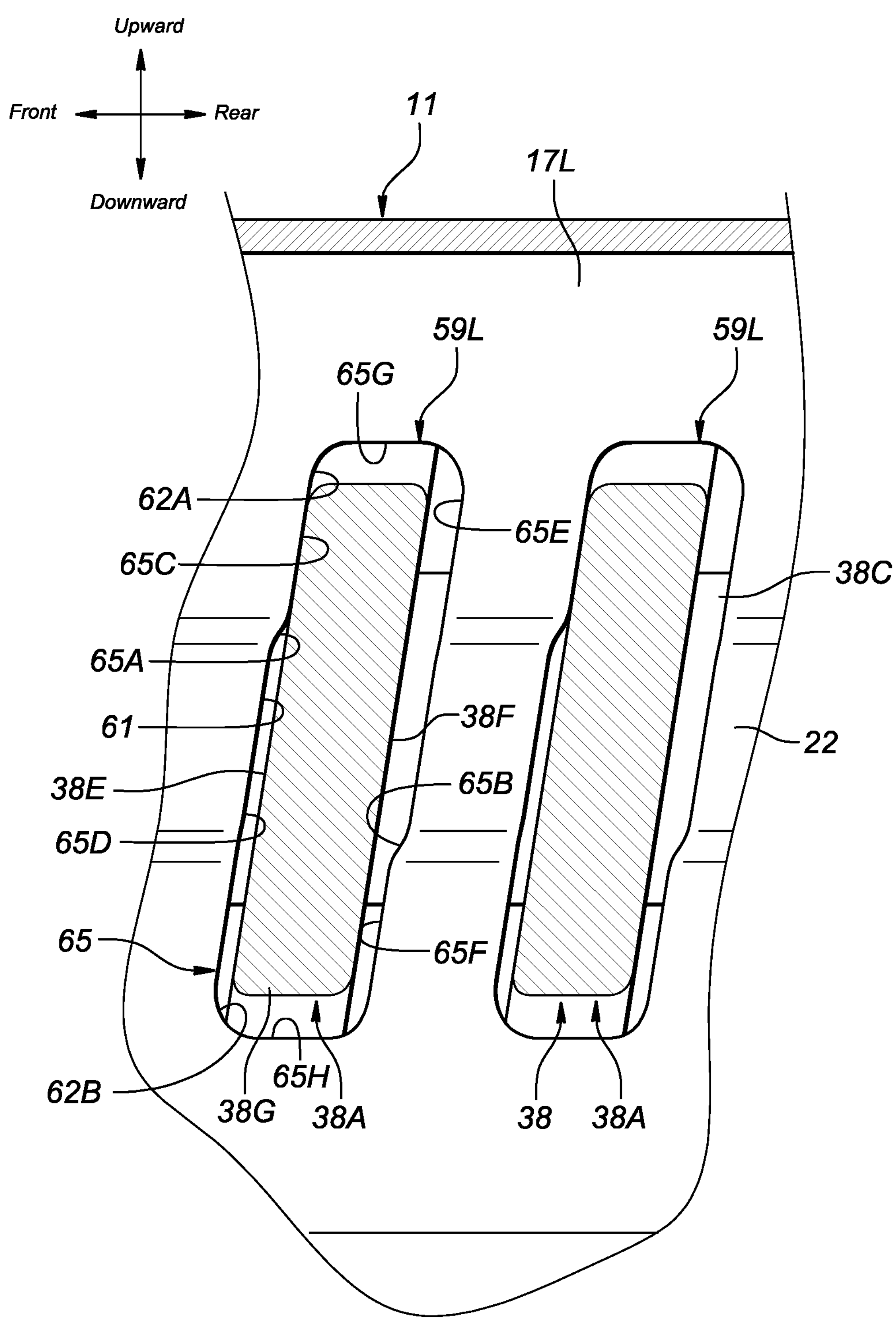
FIG. 13 is a cross-sectional view of the inside wall of the left rail, viewed from the left, according to one or more embodiments.

When the first screw member 38 rotates clockwise and the second screw member 39 rotates counterclockwise when viewed from the rear, the slider 12 moves rearward with respect to the rail 11. At this time, as shown in FIG. 13, the front side surface 38E of the thread 38A of the first screw member 38 comes into contact with (i.e., engages) the upper front edge 65C of the engagement hole 59L at the upper second portion 62A. At this time, a gap is formed between the front side surface 38E and the lower front edge 65D of the thread 38A, and the front side surface 38E and the lower front edge 65D do not come into contact with each other.

Figure 14:
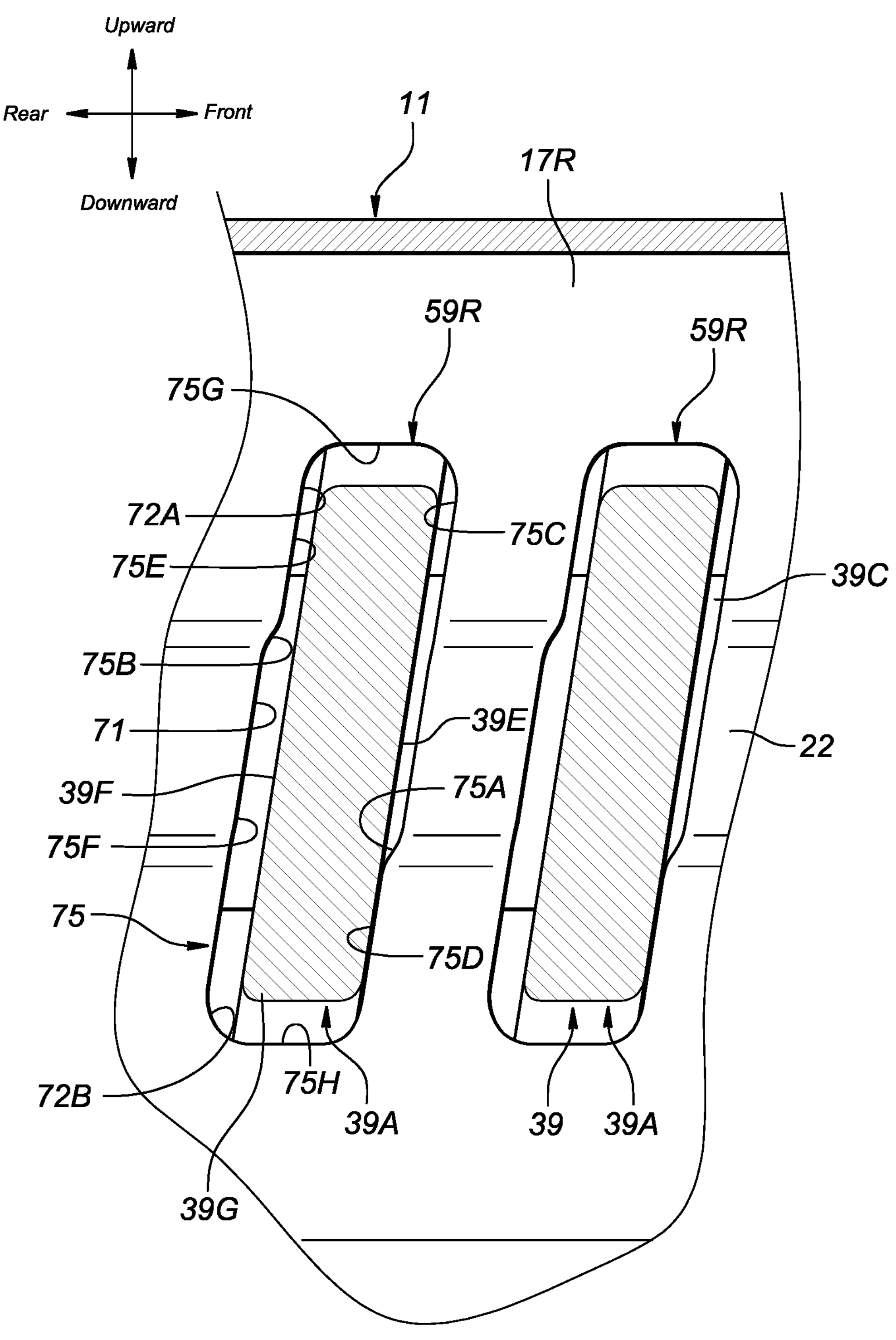
FIG. 14 is a cross-sectional view of the inner wall of the right rail, viewed from the right, according to one or more embodiments.

Further, as shown in FIG. 14, the front side surface 39E of the thread 39A of the second screw member 39 contacts the lower front edge 75D of the engagement hole 59R at the lower second portion 72B. At this time, a gap is formed between the front side surface 39E of the thread 39A and the upper front edge portion 75C, and the front side surface 39E and the upper front edge portion 75C do not come into contact with each other.

The method for manufacturing the electric slide rail 1 includes a step of forming a plurality of engagement holes 59 in the rail 11, a step of assembling a screw assembly 35 and an electric motor 36 to the slider 12, and a step of assembling the screw assembly 35 and the electric motor 36. The method may also includes a step of assembling the slider 12 to the rail 11. The method for manufacturing the rail 11 includes a step of preparing a flat metal plate, a step of forming a plurality of engagement holes 59 in the metal plate, and a step of bending the metal plate in which the plurality of engagement holes 59 are formed. The step includes forming a rail bottom wall 14, a rail outer wall 15, a rail upper wall 16, a rail inner wall 17, a rail opening 19, a step 21, and a protrusion 22.

According to this aspect, it is possible to provide a method for manufacturing an electric slide rail that can suppress fluctuations in the contact position between the screw member and the engagement hole.

According to this embodiment, the first screw member 38 does not come into contact with the edge 65 of the engagement hole 59L in the first portion 61, and the edge 65 of the engagement hole 59L does not come into contact with the edge 65 of the engagement hole 59L in at least one of the second portions 62A, 62B. Therefore, the contact position between the first screw member 38 and the engagement hole 59L is limited. Further, the second screw member 39 does not contact the edge 75 of the engagement hole 59R at the first portion 71, but contacts the edge 75 of the engagement hole 59R at least one of the second portions 72A, 72B. The contact position between the second screw member 39 and the engagement hole 59R is limited. As a result, even if a manufacturing error or deformation occurs in the electric slide rail 1, variations in the contact position between the first screw member 38 and the engagement hole 59L and the contact position between the second screw member 39 and the engagement hole 59R can be prevented. It is possible to provide an electric slide rail 1 that can be suppressed. When the contact position between the first screw member 38 and the engagement hole 59L changes, the contact angle of the first screw member 38 changes, and there is a risk that the first screw member 38 will rotate against the load applied to the slider 12 side. arise. The same applies to the second screw member 39. In the electric slide rail 1 according to the present embodiment, fluctuations in the contact position between the first screw member 38 and the engagement hole 59L and the contact position between the second screw member 39 and the engagement hole 59R are suppressed, so the electric self-locking action of the slide rail 1 functions.

Further, since a gap is formed between the upper edge 65G and lower edge 65H of the engagement hole 59L and the thread 38A of the first screw member 38, the generation of abnormal noise is suppressed, and the rotational resistance of the one screw member 38 is reduced. The same applies to the second screw member 39.

The present invention is not limited to the above-described embodiments, and can be modified and implemented in a wide range of ways. For example, the helical direction of the thread 38A of the first threaded member 38 and the threaded thread 39A of the second threaded member 39 may be changed arbitrarily. The screw thread 38A of the second screw member 39 may be determined according to the helical direction of the screw thread 39A of the second screw member 39. Moreover, the cross-sectional shape of the thread 38A can be changed arbitrarily. For example, the cross-sectional shape of the thread 38A may be trapezoidal, and the same applies to the thread 39A.

When the slider 12 engaged with the rail 1 slides back and forth with respect to the rail 1, the seat body 7 supported by the slider 12 also slides back and forth with respect to the floor 3. That is, the electric slide rail 1 plays the role of sliding the seat body 7, which is a second structure, back and forth with respect to the floor 3, which is a first structure.

The second structure such as the seat body 7 that slides by the electric slide rail 1 may be provided with various electrical components (for example, a motor of a reclining device, an operation switch 67, etc.). At this time, the second structure such as the seat body 7 functions as a support for supporting the electrical equipment. However, since the second structure that supports the electrical component moves with respect to the first structure, the cables may be routed to the electrical component in consideration of the movement of the second structure.

Figure 15:
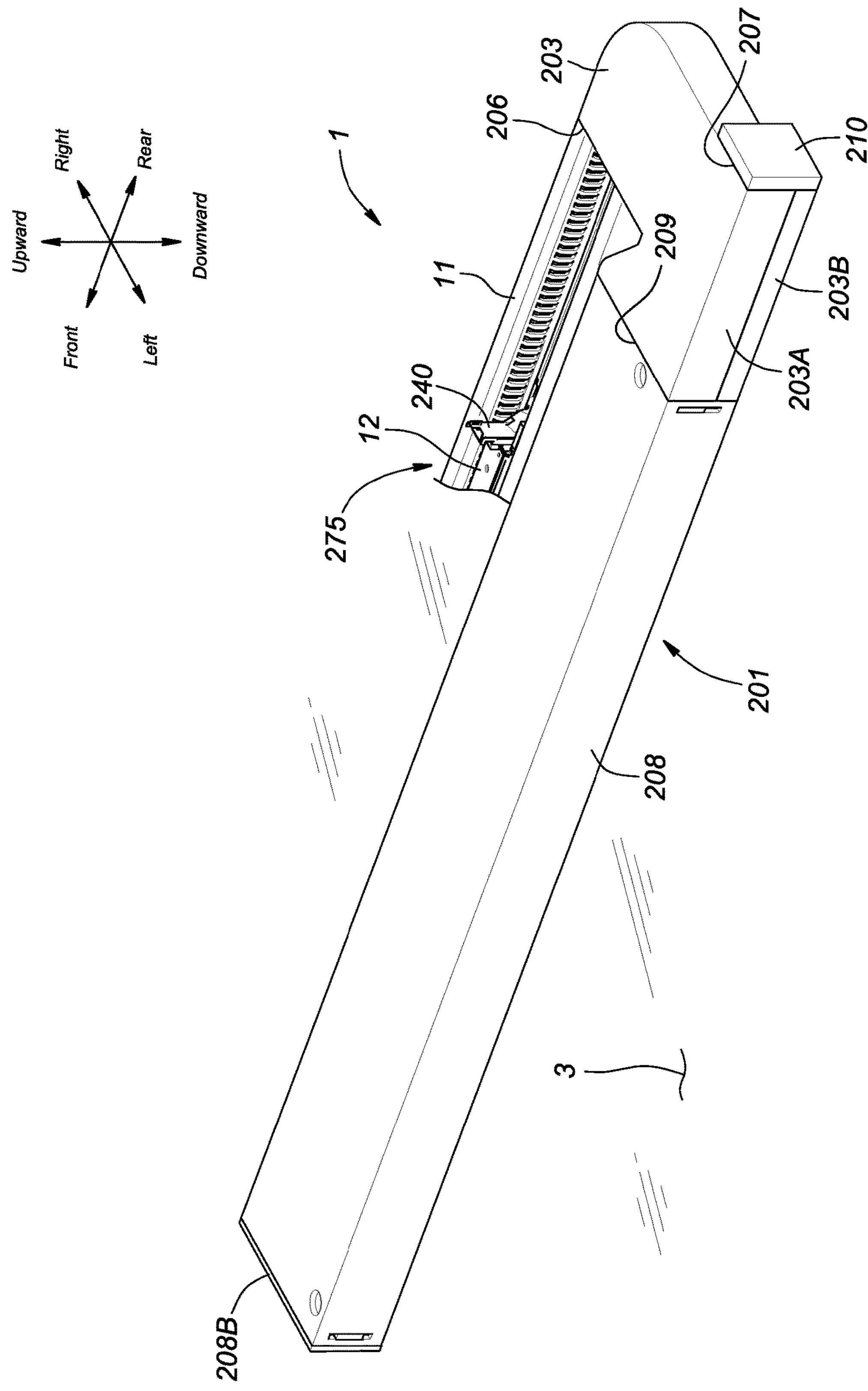
FIG. 15 is a perspective view of electric slide rail including routing device, according to one or more embodiments.

Therefore, as shown in FIG. 15, the electric slide rail 1 is equipped with a wiring device 201 for supplying power to electrical components and transmitting signals.

Figure 16:
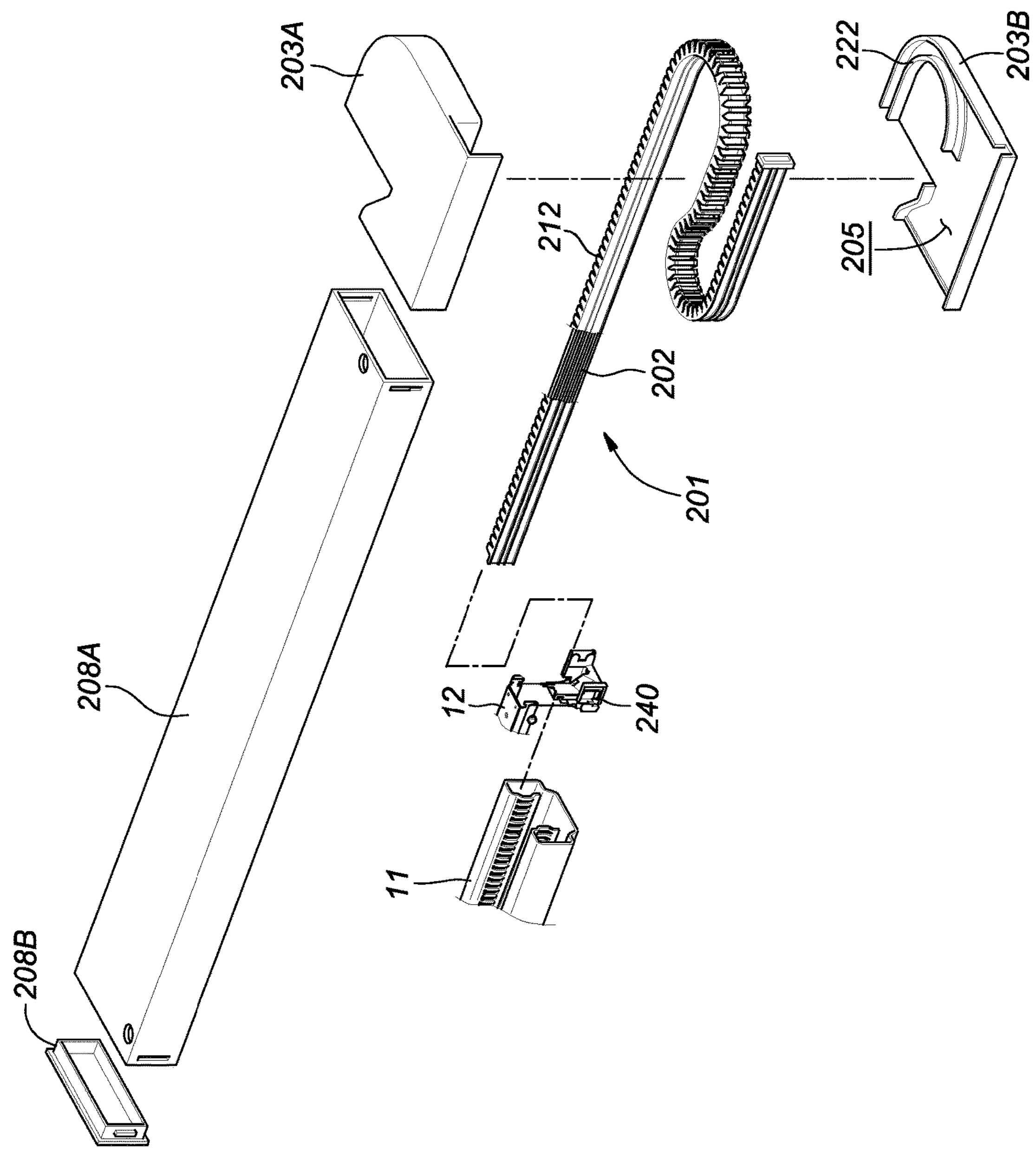
FIG. 16 is an exploded perspective view of the routing device, according to one or more embodiments.

FIG. 16 shows an exploded perspective view of the wiring device 201 of FIG. 15. As shown in FIGS. 15 and 16, the wiring device 201 includes wire harness (hereinafter, harness 202, see FIG. 16) and a storage case 203 (see FIG. 15), and the harness 202 is to be connected to electrical components such as the operation switch 67, and a part of the harness 202 is contained in the storage case 203.

The wiring device 201 suppresses unnecessary movement of the harness 202 with respect to the floor 3 in the vehicle seat 2, and allows the harness 202 to be stored and delivered according to the position of the slider 12. In some embodiments, harness 202 is used for power and communication purposes. Moreover, the wiring device 201 functions as a cover that closes the opening of the rail 11, as shown in FIG. 16.

Figure 17:
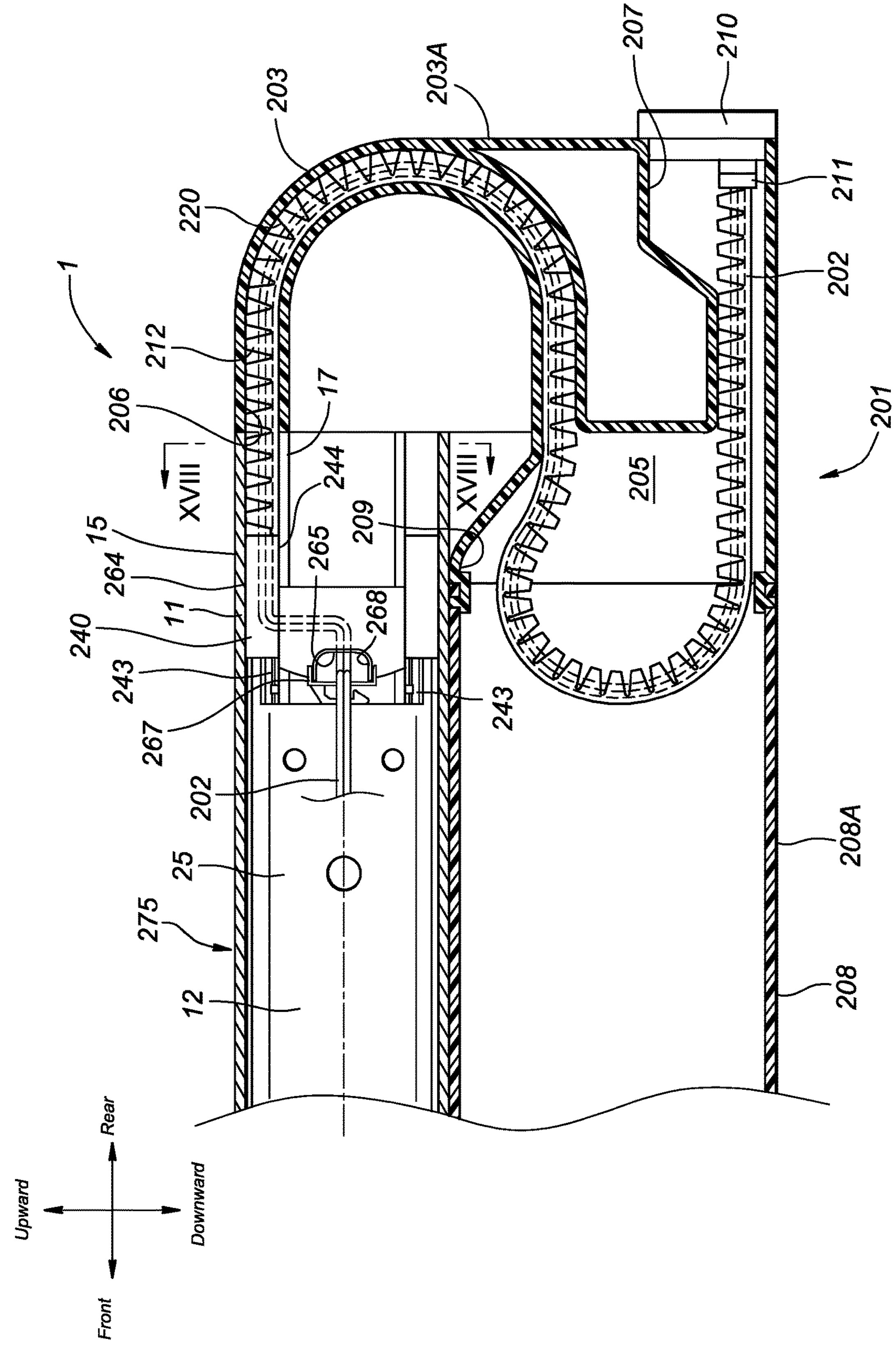
FIG. 17 is a top sectional view for explaining the structure of the wiring device, according to one or more embodiments.

The storage case 203 is a resin member and has a flat box shape. As shown in FIGS. 16 and 17, the storage case 203 has a storage space 205 (also referred to as a storage chamber) defined therein, and an entrance hole 206 and an exit hole 207 that connect the storage space 205 and the outside.

As shown in FIGS. 15 and 16, an expansion member 208 for expanding the storage space 205 is connected to the storage case 203. The expansion member 208 has a square tube shape with an opening and a bottom. In this embodiment, the expansion member 208 includes a cylindrical member 208A having a rectangular cylindrical shape, and a bottom member 208B that closes one end of the cylindrical member 208A and forms a bottom portion. The cylindrical member 208A is a metal (preferably aluminum) member, and may be formed, for example, by extrusion molding a metal material. A communication hole 209 communicating with the storage space 205 is provided on the side of the storage case 203, and the opening of the expansion member 208 is connected to the communication hole 209, thereby expanding the storage space 205.

As shown in FIGS. 15 and 17, the entrance hole 206 of the storage case 203 is provided on the front side of the right half of the storage case 203, and is connected to the front end or rear end of the rail 11. In this embodiment, the entrance hole 206 is connected to the rear end of the rail 11, as shown in FIGS. 15 and 17. The entrance hole 206 is provided at the front end of the right half of the storage case 203 and opens toward the front.

As shown in FIG. 16, a connector 210 fixed to the floor 3 is inserted into the outlet hole 207. Thereby, the storage case 203 is connected to the floor 3. As shown in FIG. 17, a connector 211 is provided at one end of the harness 202, and the connector 211 is coupled to a connector 210 provided on the floor 3. Thereby, the harness 202 is fixed to the floor 3 (vehicle body) at one end thereof, and is connected to a power source 68 (battery) and various devices provided on the vehicle body.

Figure 18:
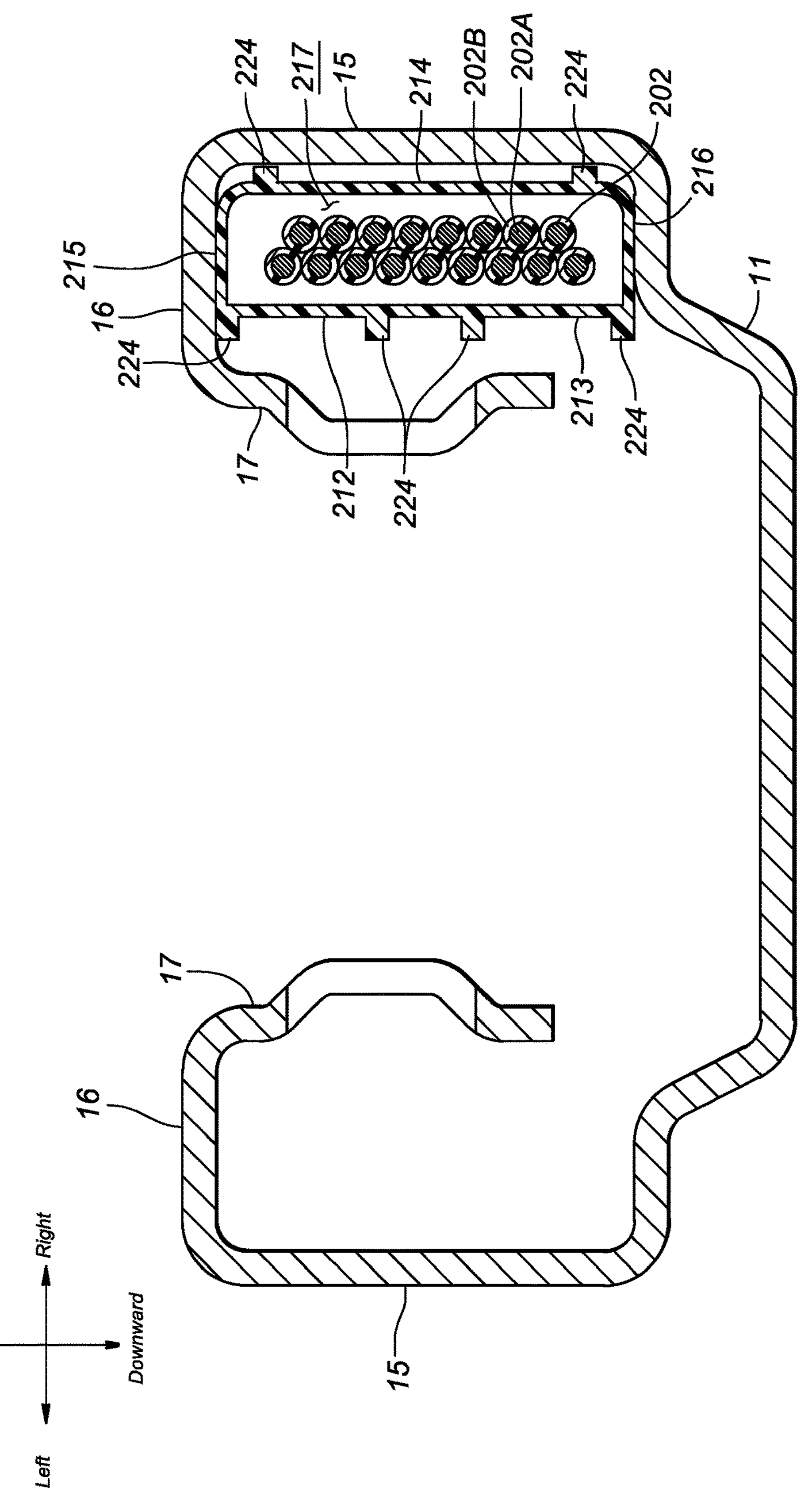
FIG. 18 is a sectional view of the portion where the protector and harness pass along section line XVIII-XVIII in FIG. 17, according to one or more embodiments.

The harness 202 sequentially passes through the connector 210, the storage space 205, and the entrance hole 206, and projects into the right rail 11 from the rear end. In this embodiment, as shown in FIG. 18, the harness 202 protrudes into a gap formed between the rail outer wall 15 and the rail inner wall 17 within the rail 11. As shown in FIG. 17, the harness 202 extends forward through the gap, passes under the rail inner wall 17 (see also FIG. 18), and reaches the slider 12.

As shown in FIG. 18, the harness 202 includes a core wire 202A made of metal, and a covering portion 202B made of an electrically insulating material and provided around the outer periphery of the core wire 202A. The core wire 202A is covered with a covering portion 202B.

Harness 202 electrically connects the two devices. Specifically, the harness 202 may be configured to connect a power source 68 (e.g., a battery) provided in the vehicle body and various electrical components. Electrical components connected to the harness 202 may include, for example, an electric motor 36 that slides the slider 12 with respect to the rail 11. In addition, the electrical components may include various actuators provided on the seat body 7. For example, the electrical components connected to the harness 202 include a reclining device that tilts the seat back 6 relative to the seat cushion 5 (specifically, a drive source for the reclining device), and a reclining device that tilts the seat back 6 with respect to the seat cushion 5, and at least one blower may be provided to blow air to the seated person.

The electrical components may include an operation switch 67 that is provided on the seat body 7 and accepts input from the seated person. In addition, the electrical components may include various acoustic devices (speakers, microphones, etc.) provided on the seat body 7, vibration generators, and notification devices that notify the seated person, such as a touch panel display. The electrical components include sensors (cameras, seating sensors, temperature sensors, etc.) that are installed in the seat body 7 to acquire biological information of the occupant and information about the external environment, and temperature controllers that control the temperature of the seating surface. In addition, the electrical components may include a control device 66 for controlling movement of the seat body 7. The electrical components may further include a device that obtains detection results by the sensor and various devices that control the operation of the notification device.

As shown in FIGS. 16 and 17, the wiring device 201 includes a harness 202 and a storage case 203, as well as a protector 212 (also referred to as a harness protector or wire protector). The protector 212 has a cylindrical shape (tube shape) and accommodates the harness 202 therein. Protector 212 is coupled (coupled) to slider 12 at one end.

As shown in FIG. 17, the protector 212 protects the harness 202 by covering a portion of the harness 202 from the vicinity of the connector 210 to the vicinity of the slider 12. In addition, in FIG. 16, in order to show that the harness 202 is accommodated inside the protector 212, a part of the protector 212 is shown broken.

Figure 19:
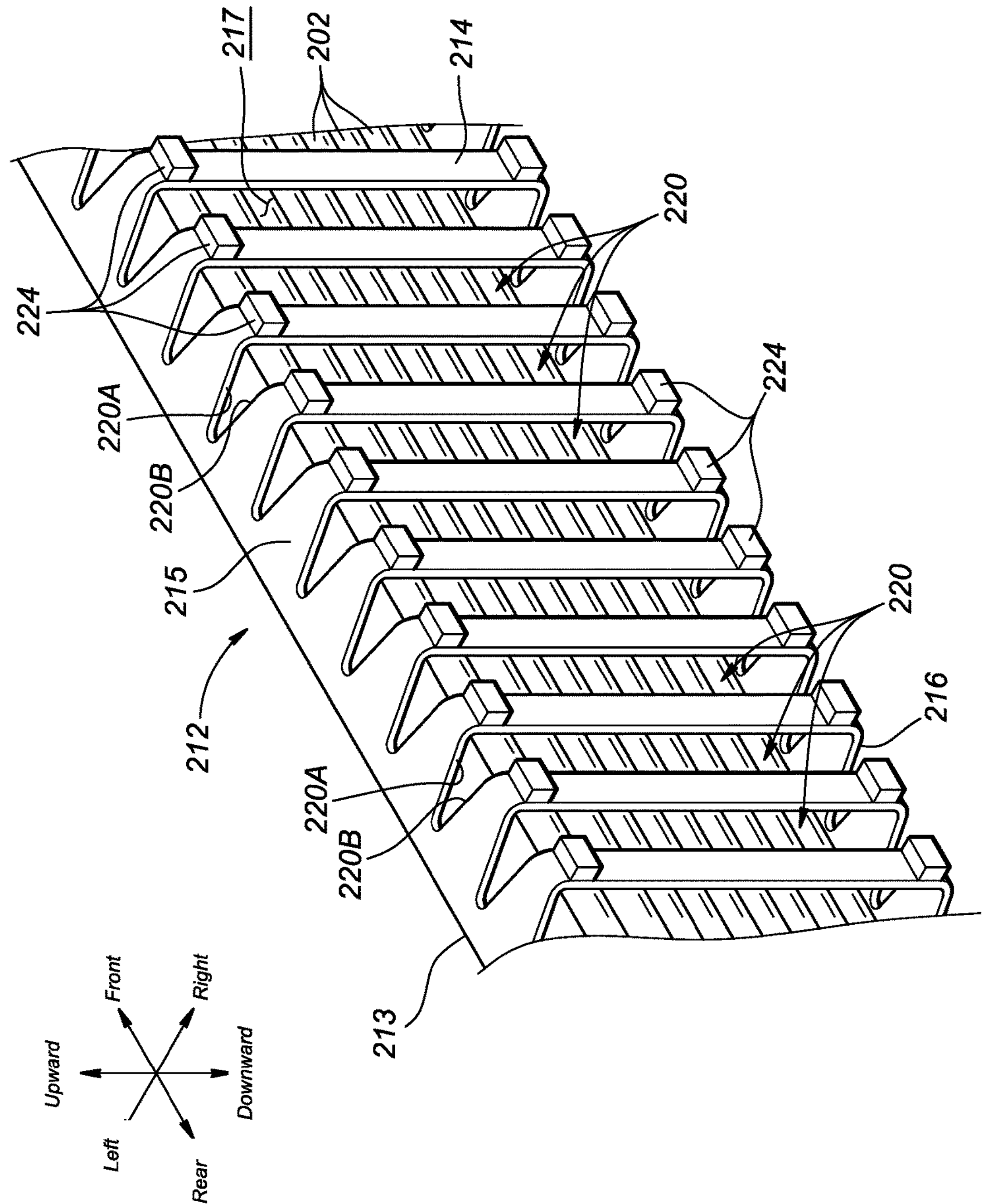
FIG. 19 is a perspective view of the protector and harness, according to the one or more embodiments.

The protector 212 is a member made of resin, and has a cylindrical shape extending along the direction in which the harness 202 extends, as shown in FIGS. 18 and 19. The protector 212 may be formed, for example, by extruding a resin material such as plastic to form a rectangular cylinder, and cutting the rectangular cylinder. For convenience of explanation, the following will focus on the portion of the protector 212 that passes through the rail 11 and covers the harness 202 extending in the front-rear direction, and will be described in terms of the up, down, left, and right directions; however, other portions of the protector 212 also has a similar configuration.

A first embodiment of the protector 212 is shown in FIGS. 18 and 19. As shown in FIG. 18, the protector 212 according to the first embodiment has a left wall 213, a right wall 214, an upper wall 215, and a lower wall 216, and has a substantially square cylindrical shape with an inner chamber 217 that accommodates the harness 202. The left wall 213, the right wall 214, the upper wall 215, and the lower wall 216 are each configured by a plate-shaped wall body facing in a direction perpendicular to the extending direction of the harness 202. The left wall 213 is provided on the left side of the protector 212 and has a surface facing left. The right wall 214 is provided on the right side of the protector 212 and has a surface facing right (in the opposite direction to the left wall 213). The upper wall 215 is provided above the protector 212 and has a surface facing upward, and the lower wall 216 is provided below the protector 212 and has a surface facing downward.

As shown in FIG. 19, the protector 212 is provided with a plurality of slits 220 cut out from the right side to the left side. By providing the slit 220, the protector 212 is configured to be able to bend and deform to the left and right sides. The width of the slit 220 in the front-rear direction, 220A, 220B, becomes gradually wider from the left side to the right side. In this embodiment, the slit 220 has a triangular shape (also referred to as a wedge shape) when viewed from above (more specifically, when viewed from above). It is preferable that the slits 220 are provided at approximately equal intervals along the extending direction of the protector 212.

Figure 20A:
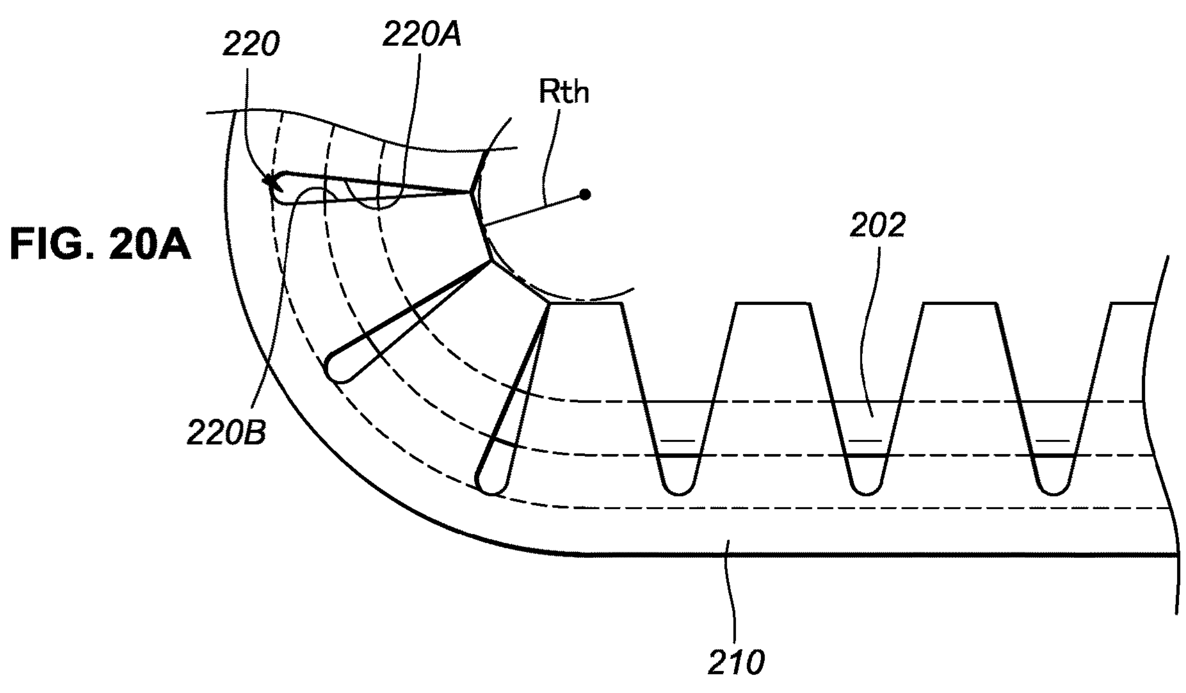
FIG. 20A is a top view of the protector when bent to the right side, according to one or more embodiments.
Figure 20B:
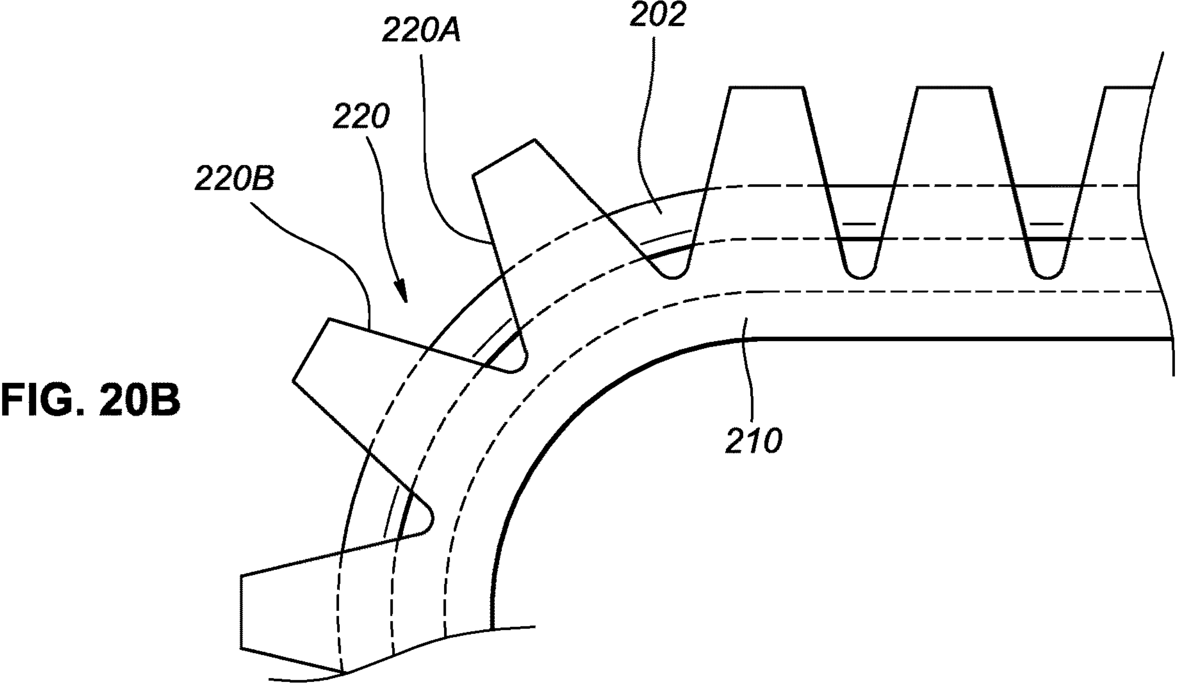
FIG. 20B is a top view of the protector when bent to the left side, according to one or more embodiments.

FIG. 20A shows a case where the protector 212 is bent to the right when viewed from above, and FIG. 20B shows a case where the protector 212 is bent to the left when viewed from above. As shown in FIGS. 20A and 20B, the protector 212 is bent and deformed on both the left and right sides (i.e., one side perpendicular to the extension direction and the other side opposite to the one side).

However, when the protector 212 is bent to the right as shown in FIG. 20A, it is limited to a range that is equal to or greater than a predetermined threshold value Rth. This can prevent the bending radius of the harness 202 from becoming too small when the protector 212 is bent to the right. Note that the bending radius (also referred to as bending radius) herein refers to the radius of a circle (see the dashed-dotted line in FIG. 20A) that can best express the inner curvature of the protector 212 at the bending point. The smaller the bending radius, the larger the curvature.

Figure 21:
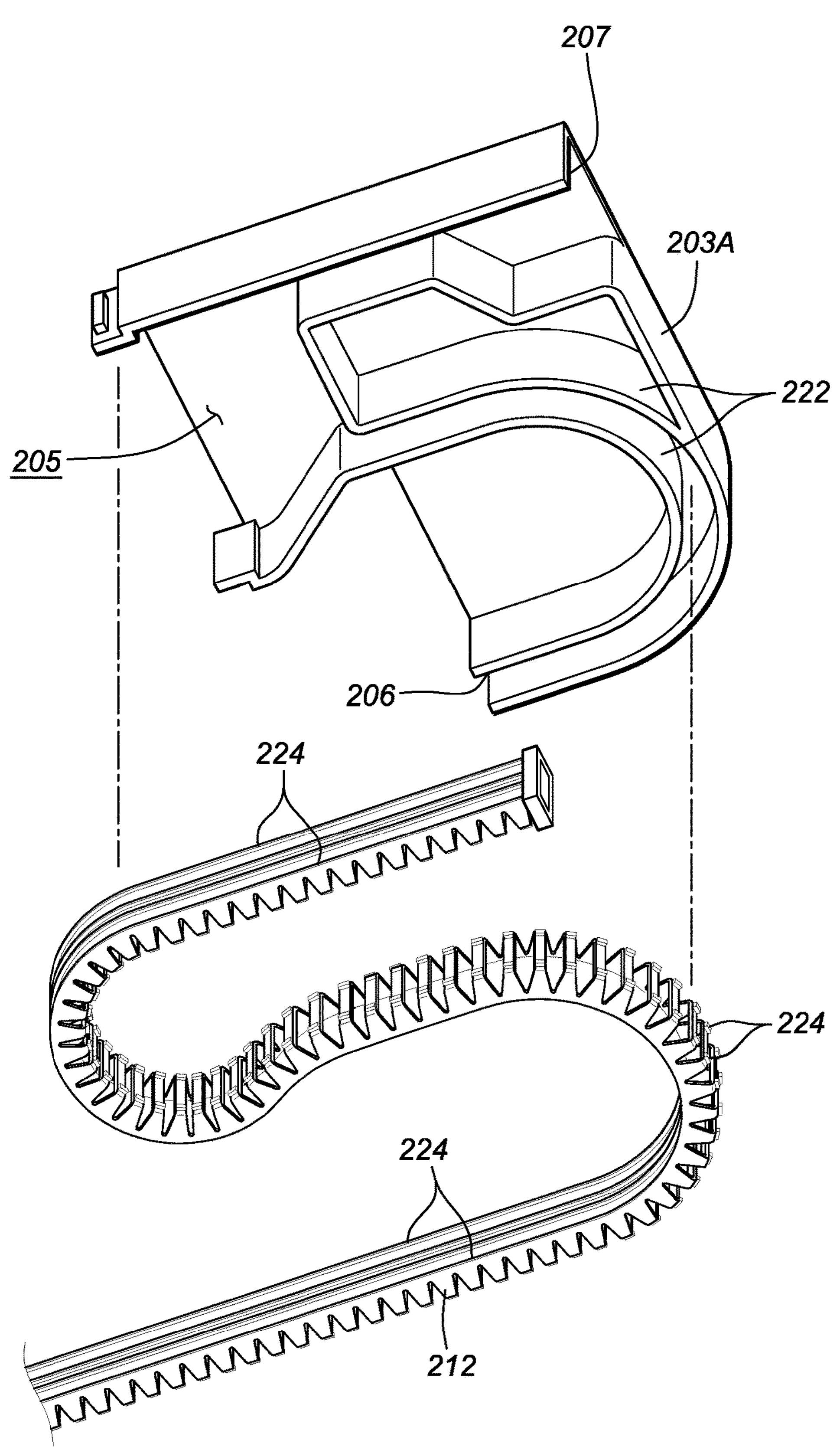
FIG. 21 is a perspective view for explaining the attachment of the protector and harness to the case upper member, according to one or more embodiments.

As shown in FIGS. 17 and 21, the protector 212 and a portion of the harness 202 are stored in a storage space 205 provided in the storage case 203. A guide wall 222 is provided inside the storage case 203 to guide the direction of movement of the protector 212. In this embodiment, the guide wall 222 is curved in a substantially arc shape.

As shown in FIG. 17, the protector 212 extends linearly from near the connector 210 in the storage space 205, and then curves toward the side where the slit 220 is provided (to the right). Thereafter, the protector 212 curves to the opposite side (left side) from the side where the slit 220 is provided while contacting the guide wall 222, passes through the entrance hole 206, and enters the outside of the storage space 205 (the outside of the storage case 203). It is extending. In this way, the protector 212 has an S-shape that curves toward the side where the slit 220 is provided and the side opposite to the side where the slit 220 is provided in the storage space 205.

The guide wall 222 slides on the side surface of the protector 212 to guide the protector 212 moving within the storage space 205 so as to curve smoothly to the opposite side (left side) from the side where the slit 220 is provided. This prevents the bending radius of the harness 202 from becoming too small.

In order to configure such a guide wall 222, as shown in FIG. 16, the storage case 203 is composed of a case upper member 203A that constitutes its upper half and a case lower member 203B that constitutes its lower half. By connecting the case upper member 203A and the case lower member 203B, a storage space 205 in which the harness 202 and the protector 212 can be stored is configured in the storage case 203. FIG. 21 shows a case where the upper half of the guide wall 222 is provided on the case upper member 203A, and is a perspective view of the case upper member 203A viewed from below.

As shown in FIGS. 17 and 18, the protector 212 passes through the entrance hole 206 together with the harness 202 and enters the gap formed between the rail outer wall 15 and the rail inner wall 17. The protector 212 and the harness 202 extend forward through the gap and reach the vicinity of the slider 12. The protector 212 has an opening near the slider 12, and the harness 202 extends from the opening, passes under the rail inner wall 17, and extends to the slider 12. Thereby, the harness 202 and the protector 212 can be accommodated in the rail 11, so that the harness 202 and the protector 212 can be well protected.

As shown in FIGS. 18 and 19, the outer surface of the protector 212 is provided with a projection 224 that projects outward. The protrusions 224 are provided on the outer surface of the right wall 214 and the outer surface of the left wall 213 of the protector 212, respectively.

In this embodiment, each of the protrusions 224 is a protrusion extending in the direction in which the protector 212 extends (that is, in the front-rear direction). In this embodiment, protrusions 224 are provided on the right wall 214 so as to form protrusions extending back and forth on the upper and lower edges, respectively. The left wall 213 is provided with protrusions 224 extending back and forth on the upper and lower edges of the left wall 213, respectively, and furthermore, two protrusions 224 are arranged vertically at approximately the center of the left wall 213 in the vertical direction. and are provided so as to form protrusions extending in the front-rear direction.

These protrusions 224 (projections) can reduce the contact area between the protector 212 and the rail outer wall 15 and the contact area between the protector 212 and the rail inner wall 17. This suppresses sliding resistance when the protector 212 slides within the rail 11. Moreover, since the protrusion 224 is formed to extend in the extending direction of the protector 212, the contact area between the protector 212 and the rail inner wall 17 can be more reliably reduced.

Figure 22:
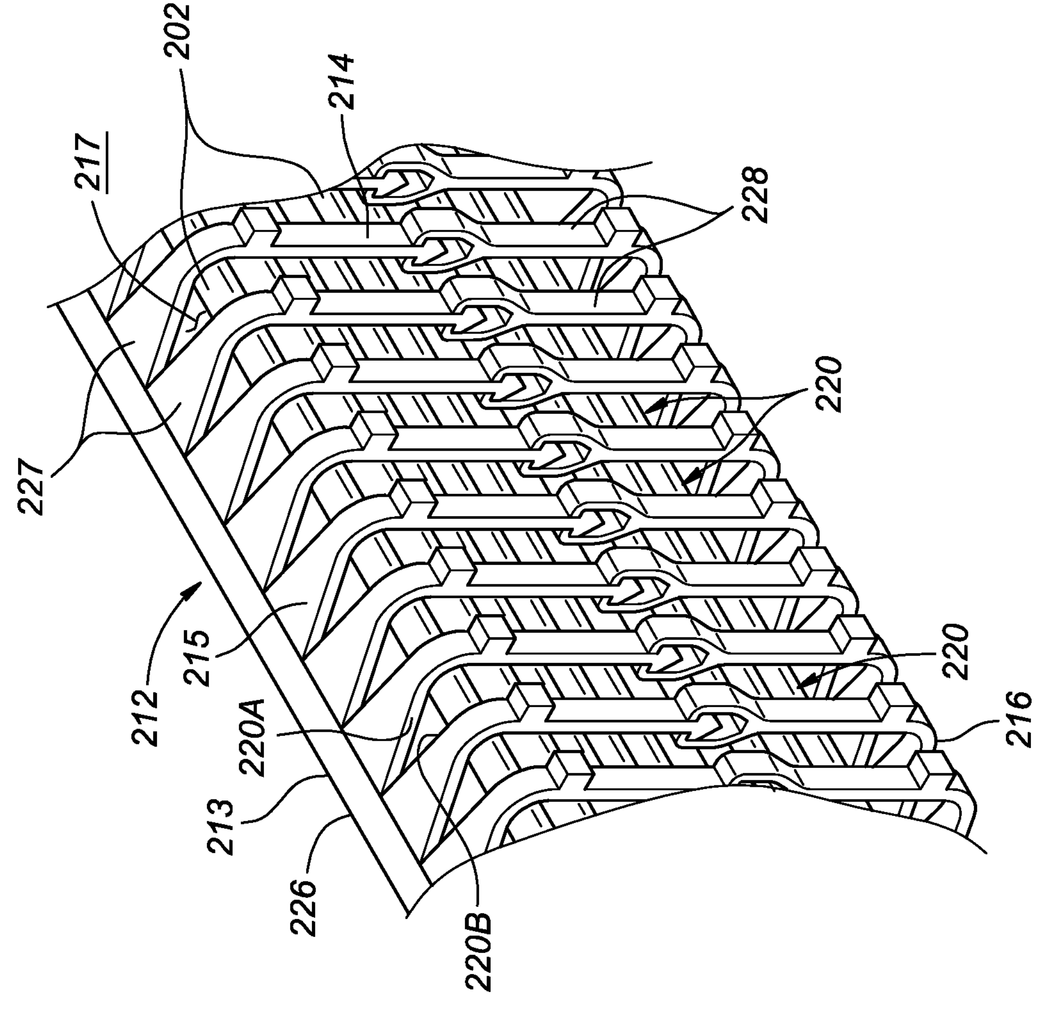
FIG. 22 is a perspective view of a protector and a harness, according to one or more embodiments.
Figure 22:
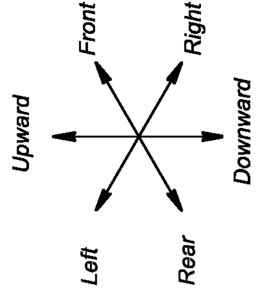

Another embodiment of the protector 212 is shown in FIGS. 22 and 23. As shown in FIG. 22, the protector 212 according to a second embodiment is a resin member like the first embodiment detailed above, and has a left wall 213, a right wall 214, an upper wall 215, and a lower wall 216. It has a substantially rectangular cylindrical shape with an inner chamber 217 that accommodates the harness 202.

The protector 212 according to the second embodiment includes a plate-shaped main part 226 having a surface facing in the left-right direction, an upper connecting part 227 connected to the upper end of the main part 226, and a lower connecting part 228 connected to the lower end of the main part 226. A connecting portion 228 is provided. The main part 226 constitutes the left wall 213 of the protector 212, the upper connecting part 227 constitutes the upper half of the upper wall 215 and the right wall 214, and the lower connecting part 228 constitutes the lower half of the lower wall 216 and the right wall 214.

Figures 23A, 23B:
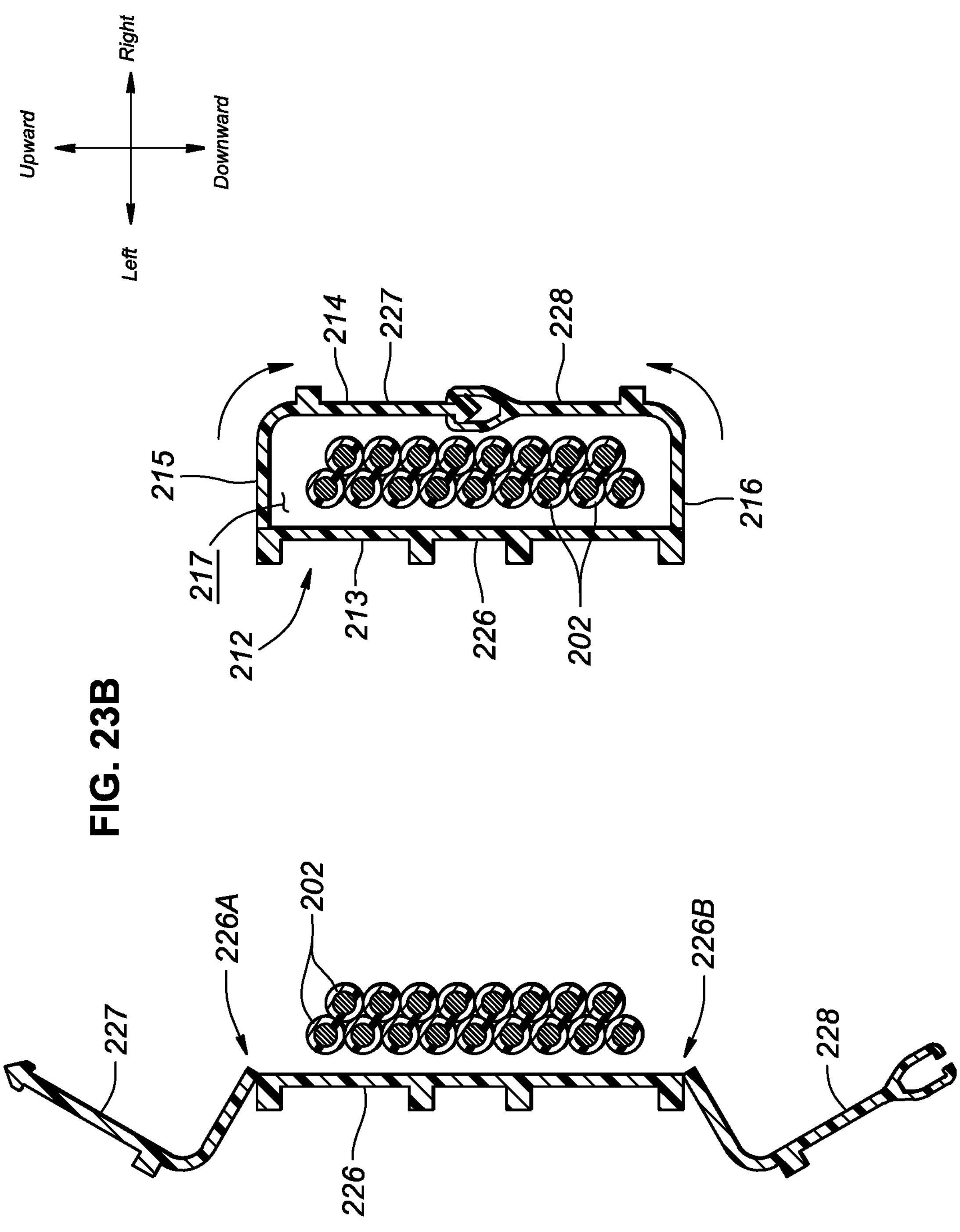
FIG. 23A is a sectional view explaining assembly of the protector and harness, according to one or more embodiments.
FIG. 23B sectional view explaining assembly of the protector and harness, according to one or more embodiments.

As shown in FIG. 23A, one end of the upper connecting portion 227 is hingedly connected to the upper end of the main portion 226 via a hinge portion 226A. Thereby, the upper connecting part 227 is rotatably connected to the upper end of the main part 226 at one end about an axis extending in the front-rear direction. The lower connecting portion 228 is hingedly connected at one end to the lower end of the main portion 226 via a hinge portion 226B. Thereby, the lower connecting part 228 is connected at one end so as to be rotatable about an axis extending in the front-rear direction of the lower end of the main part 226 (see the arrow in FIG. 23B). The upper connecting portion 227 and the lower connecting portion 228 are configured to be connectable to each other at the other end. By connecting the upper connecting portion 227 and the lower connecting portion 228, an inner chamber 217 that accommodates the harness 202 is configured as shown in FIG. 23B.

In this manner, the protector 212 according to the second embodiment can easily configure the inner chamber 217 that accommodates the harness 202. Further, in the protector 212 according to the second embodiment, the harness 202 can be easily accommodated in the inner chamber 217 by connecting the upper connecting part 227 and the lower connecting part 228.

As shown in FIGS. 16 and 17, one end of the protector 212 is coupled (connected) to the slider 12 via a coupling member 240. The configuration of the coupling member 240 will be described below. Note that the other end of the protector 212 may be coupled to a connector 211 provided on the harness 202.

Engaging portions 243 are provided at the front portions of both left and right edges of the base portion 242. A protector connection portion 244 is provided at the rear right edge of the base portion 242.

A pair of left and right extensions 245 are provided at the rear end of the slider 12. The extending portions 245 are each configured by the slider inner wall 26, the slider lower wall 27, and the slider outer wall 28 extending rearward. Of the extension part 245, the part continuous to the slider inner wall 26 is called the extension part inner wall 246, the extension part lower wall 247 continuous to the slider lower wall 27, and the part continuous to the slider outer wall 28 is called the extension part outer wall 248.

An upper notch 250 recessed downward is provided at the upper edge of the inner wall 246 of the extension. The extending lower wall 247 is provided with a receiving hole 251 that penetrates in the vertical direction. The receiving hole 251 extends to the lower edge of the inner wall 246 of the extending portion, and a lower notch 252 cut upward is formed at the lower edge of the inner wall 246 of the extending portion.

Figure 24:
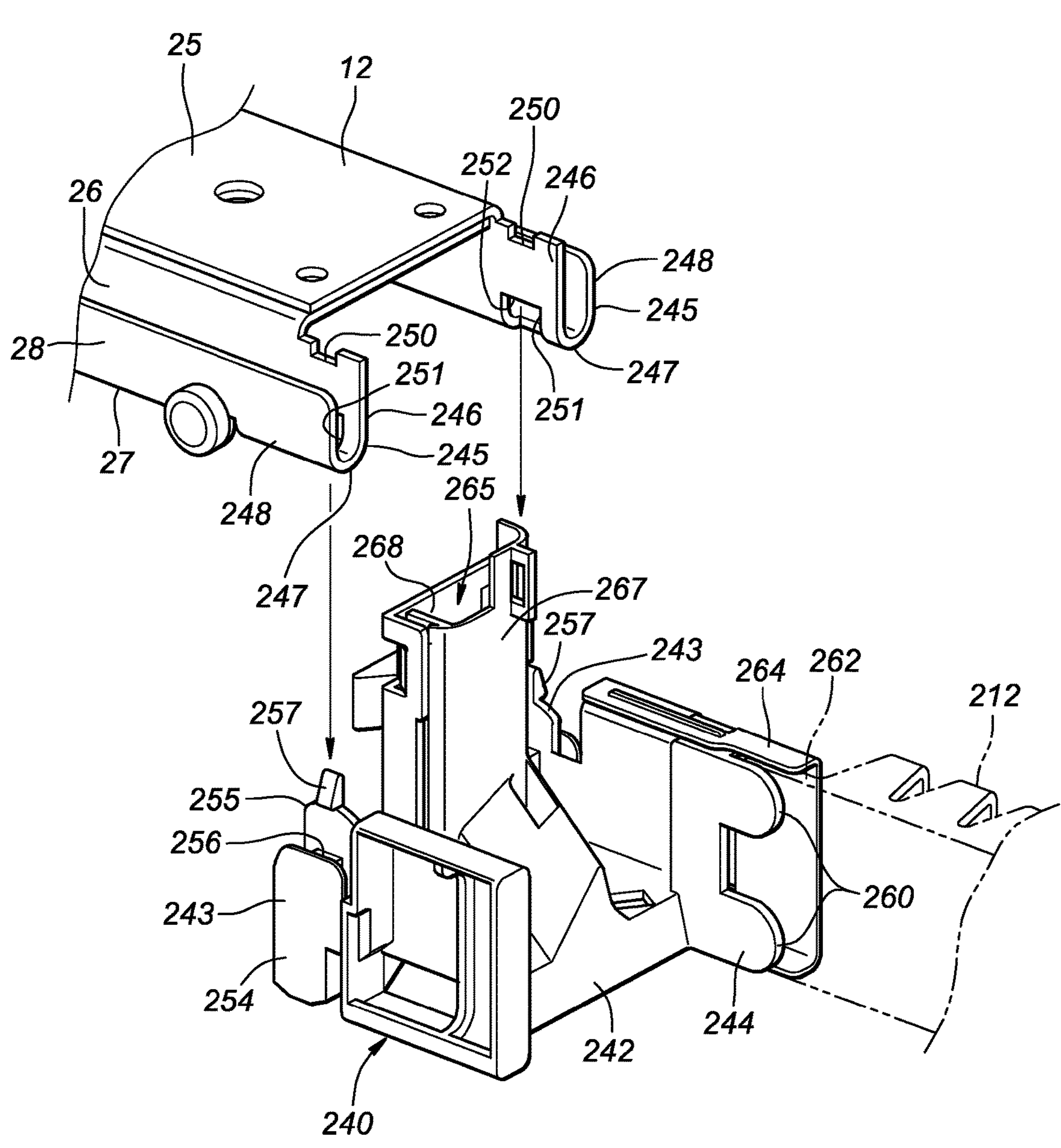
FIG. 24 is a perspective view for explaining the assembly of the coupling member to the slider, according to one or more embodiments.

As shown in FIG. 24, the slider engaging portion 243 is coupled to the extending portion 245 with a portion thereof received in the receiving hole 251 (see the arrow in FIG. 24). The slider engaging portion 243 includes an outer wall portion 254 disposed between an inner wall 246 of the extension portion and an outer wall 248 of the extension portion, an inner wall portion 255 disposed inside the inner wall 246 of the extension portion, and an inner wall portion 255. It includes a lateral connection part 256 that connects to the outer wall part 254.

A latching claw 257 that is latched onto the upper notch 250 is provided at the upper end of the inner wall portion 255. By inserting the lateral connecting portion 256 into the lower notch 252 and latching the latching claw 257 to the upper notch 250, the inner wall 246 of the extension portion is held between the latching claw 257 and the lateral connecting portion 256. As a result, the slider engaging portion 243 and the extending portion 245 are coupled, and the coupling member 240 is connected to the rear portion of the slider 12. Note that since the outer wall portion 254 restricts the movement of the inner wall 246 of the extension portion and the outer wall 248 of the extension portion in the left-right direction, it is possible to suppress the occurrence of misalignment between the coupling member 240 and the rear portion of the slider 12 in the left-right direction.

Figure 25:
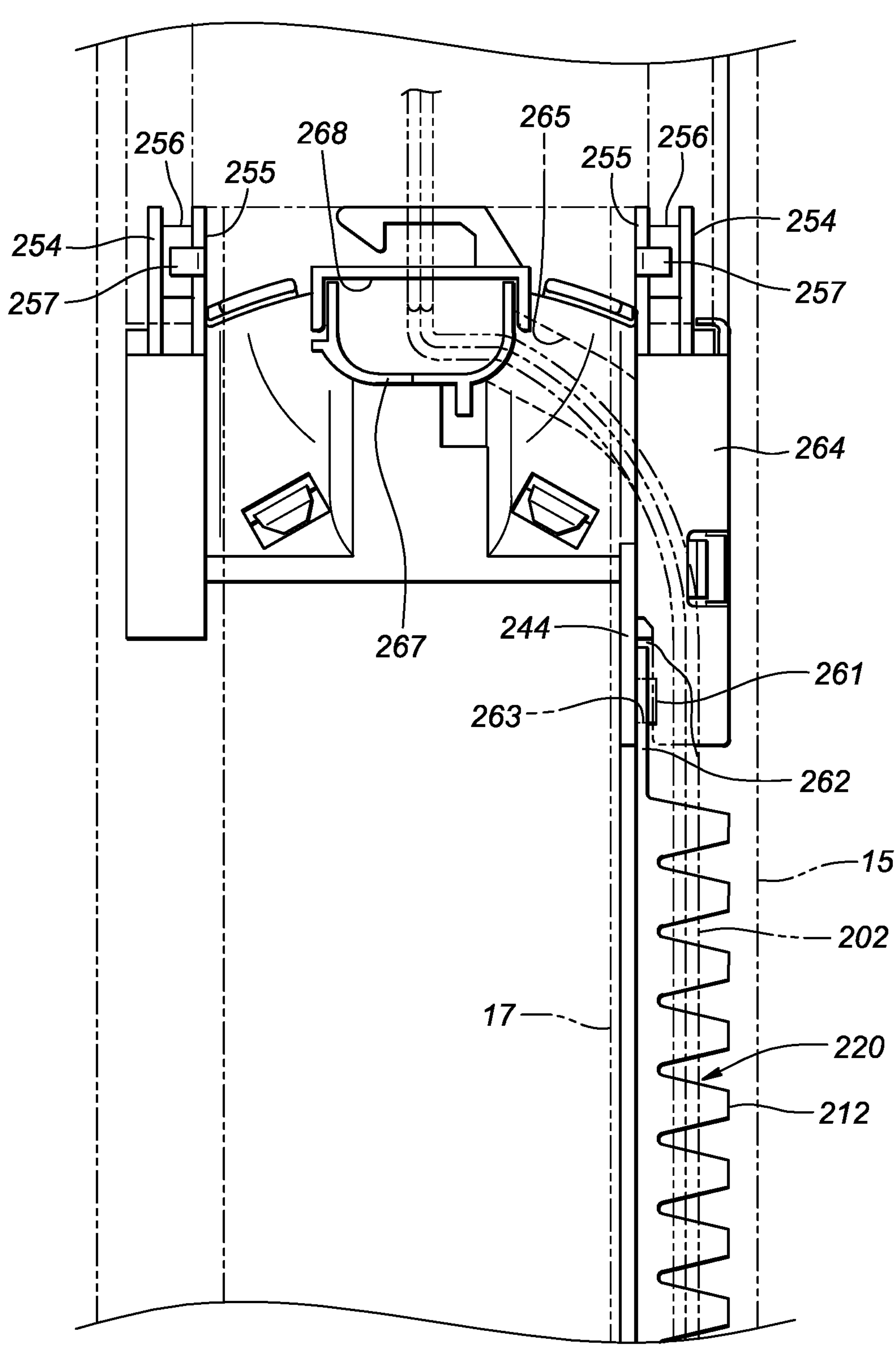
FIG. 25 is a top view of the connecting part of the slider and protector, according to one or more embodiments.

The protector connection portion 244 includes a pair of upper and lower projecting pieces 260 that extend rearward. The protruding pieces 260 each have a plate shape with surfaces facing in the left-right direction. As shown in FIG. 25, each of the protruding pieces 260 is provided with an engaging protrusion 261 that protrudes in the left-right direction. The front edge of the protector 212 is provided with an extending piece 262 that extends forward. The extending piece 262 has a plate shape with a surface facing in the left-right direction, and an engaging hole 263 for receiving the engaging protrusion 261 is provided in the extending piece 262. The diameter of the engagement hole 263 is approximately equal to the diameter of the engagement protrusion 261, and when the engagement protrusion 261 projects into the engagement hole 263 and is received, the protrusion piece 260 and the extension piece 262 are coupled. This causes the coupling member 240 to couple with the front edge of the protector 212.

As shown in FIGS. 24 and 25, the protector connection portion 244 is provided with a protection member 264 that covers the protrusion piece 260 from the right side. The protection member 264 covers the joint portion between the protrusion piece 260 and the extension piece 262 and prevents the joint member 240 and the protector 212 from being separated. Note that, as shown in FIG. 25, the coupling member 240 is coupled between the front edge of the protector 212, the rail outer wall 15, and the rail inner wall 17.

The base portion 242 is provided with a through hole 265 that is a through hole through which the harness 202 passes. As shown in FIG. 25, the through hole 265 opens in front of the protector connection portion 244 and extends toward the left and right center of the base portion 242. Thereafter, the through hole 265 extends upward, reaches the upper surface of the base 242, and opens at the upper surface of the base 242 (the side surface on the sheet main body 7 side).

As shown in FIG. 24, a cylindrical portion 267 that has a cylindrical shape and extends upward is connected to the opening of the through hole 265 provided on the upper surface of the base portion 242. An inner hole 268 is formed in the cylindrical portion 267 and penetrates in the vertical direction, and the inner hole 268 communicates with the through hole 265.

As shown in FIG. 17, the harness 202 extends forward from the front edge of the protector 212, enters the through hole 265, and then passes through the inner hole 268 of the cylindrical portion 267 to reach above the base portion 242. The harness 202 is guided by the cylindrical portion 267 so as to extend upward (that is, toward the seat body 7).

Figure 26:
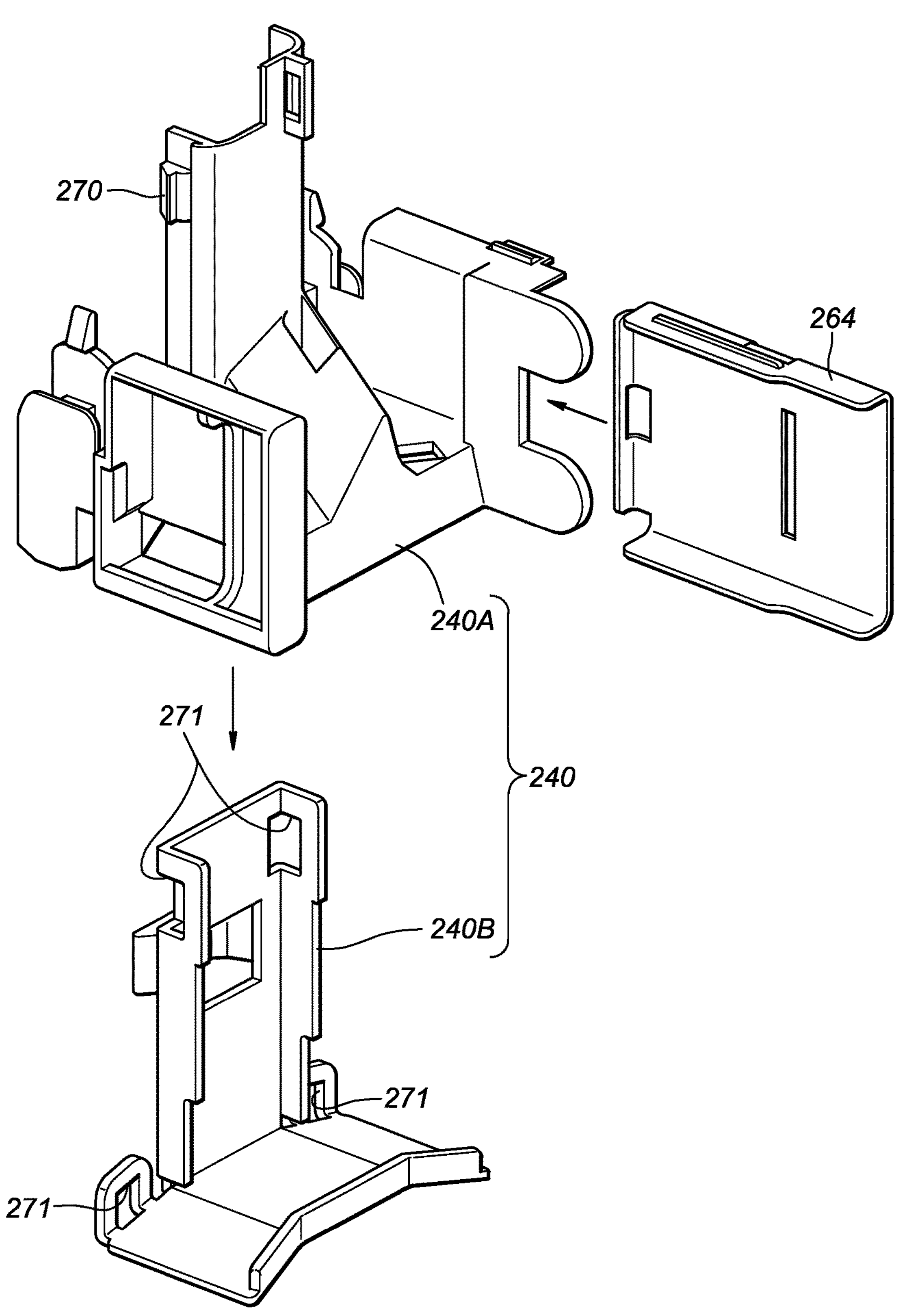
FIG. 26 is an exploded perspective view of the connecting member, according to one or more embodiments.

In this embodiment, as shown in FIG. 26, the coupling member 240 includes a first coupling member 240A and a second coupling member 240B. The first coupling member 240A constitutes the upper half of the base 242, the rear half of the cylindrical portion 267, the slider engaging portion 243, and the protector connecting portion 244. The second coupling member 240B constitutes the lower half of the base portion 242 and the front half of the cylindrical portion 267. One of the first coupling member 240A and the second coupling member 240B is provided with a locking pawl 270, and the other is provided with a locking hole 271 into which the locking pawl 270 is locked. When the locking pawl 270 is locked in the locking hole 271, the first coupling member 240A and the second coupling member 240B are coupled.

By coupling the first coupling member 240A and the second coupling member 240B, a through hole 265 is formed between them. Further, the rear half of the cylindrical portion 267 provided on the first coupling member 240A and the front half of the cylindrical portion 267 provided on the second coupling member 240B are connected to form the cylindrical portion 267. The protection member 264 is coupled to the side of the first coupling member 240A.

Next, when manufacturing the electric slide rail 1, the worker first assembles the wiring device 201. The operator first passes the harness 202 through the protector 212 and then assembles the coupling member 240 to the protector 212. After that, the operator places the protector 212 along the guide wall 222 provided on the upper case member 203A, and couples the upper case member 203A and the lower case member 203B. As a result, the protector 212 and a portion of the harness 202 are stored inside the storage case 203. Thereafter, when the operator assembles the expansion member 208 into the storage case 203, the assembly of the wiring device 201 is completed.

An operator fixes the rail device 275 to the floor 3, which includes the rail 11 and the slider 12 connected so as to be slidable. Thereafter, the operator connects the end of the harness 202 that has been inserted into the protector 212 to the connector 210 and inserts the connector 210 into the outlet hole 207 of the storage case 203 while inserting the protector 212 into the rail 11. By connecting the connector 210 to the outlet hole 207 of the storage case 203, the storage case 203 is fixed to the floor 3. Note that at this time, the operator may fix the storage case 203 and the expansion member 208 to the floor 3 with bolts or the like. Next, the operator adjusts the position of the slider 12 and connects the coupling member 240 to the slider 12, thereby completing the manufacture of the electric slide rail 1.

Next, the feeding and storing operations of the harness 202 and the effects of the electric slide rail 1 will be explained.

Figure 27A:
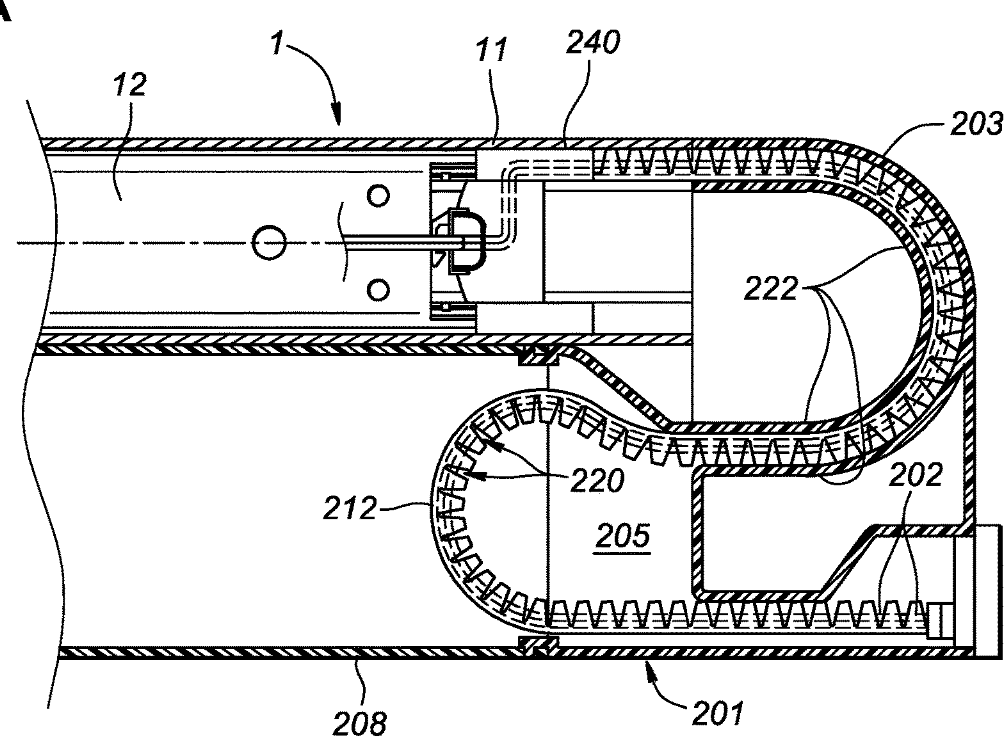
FIG. 27A is a top sectional view of the routing device, and (B) a top sectional view of the routing device when the slider moves further forward than in (A), according to one or more embodiments.
Figure 27B:
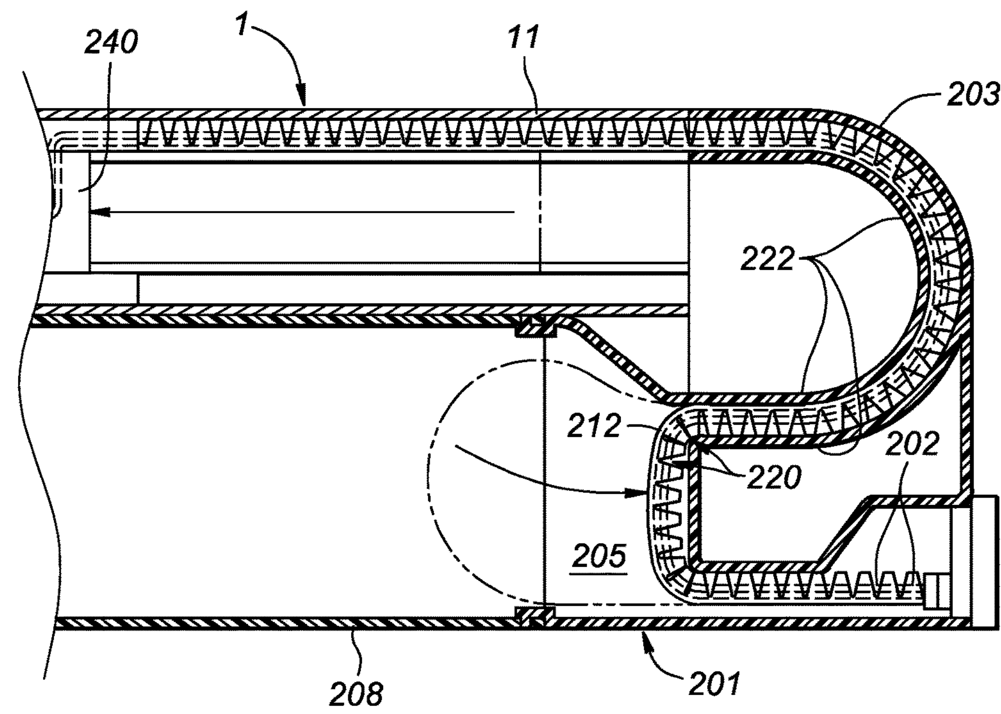
FIG. 27B is a top sectional view of the routing device when the slider moves further forward than in FIG. 27A, according to one or more embodiments.

As shown by the arrow in FIG. 27A, when the slider 12 moves forward with respect to the rail 11 and is displaced from the position shown in FIG. 27A to the position shown in FIG. 27B, the harness 202 and protector 212 is sent forward through the inlet hole 206.

As a result, the length of the portion of the harness 202 and the protector 212 that is accommodated in the storage case 203 and the expansion member 208 is shortened. Therefore, as shown by the arrow in FIG. 27B, the protector 212 moves, and the bending radius of the harness 202 and the protector 212 becomes smaller.

When the slider 12 moves backward with respect to the rail 11, the protector 212 and the harness 202 are pushed backward by the slider 12 from the position shown in FIG. 27B to the position shown in FIG. 27A. As a result, the protector 212 and the harness 202 pass through the entrance hole 206 and are pushed into the storage case 203.

As a result, the lengths of the portions of the protector 212 and the harness 202 that are accommodated in the storage case 203 and the expansion member 208 become longer. At this time, the protector 212 is guided by the guide wall 222, and the protector 212 moves in the direction opposite to the direction of the arrow in FIG. 27B. As a result, the length of the portion of the harness 202 stored in the storage case 203 and the expansion member 208 becomes longer, and the harness 202 is stored in the storage case 203 and the expansion member 208 from the entrance hole 206.

In this way, the harness 202 and protector 212 are taken in and out of the storage case 203 via the entrance hole 206. As the harness 202 and the protector 212 are stored and delivered by the movement of the slider 12, the bending radius of the portion of the harness 202 and the protector 212 accommodated inside the storage case 203 and the expansion member 208 changes. At this time, the bending radius of the harness 202 becomes too small, and an excessive load may be applied to the harness 202.

However, as shown in FIGS. 20A and 20B, when the protector 212 is bent to one side in the extending direction (the right side in FIG. 20A), the bending radius is equal to or larger than the predetermined threshold value Rth. Therefore, as shown in FIG. 20B, when the protector 212 is bent to one side in the extending direction, the bending radius of the harness 202 does not become too small, and the load that may be applied to the harness 202 can be reduced.

Although the description of the specific embodiments has been completed above, the present invention is not limited to the above-mentioned embodiments and can be widely modified and implemented.

In the embodiment described above, the example in which the wiring device 201 is provided on the electric slide rail 1 has been described, but the wiring device 201 may be provided on a slide rail that is manually slid by the seated person.

In the above embodiment, the seat body 7 is the second structure, and the electrical components are provided in the seat body 7, but the present invention is not limited to this aspect. For example, the slider 12 may be the second structure, and the electrical component may be an electric motor 36 for sliding the slider 12 with respect to the rail 11. Alternatively, the base may be the first structure, the work holder may be the second structure, and the electrical components may be various actuators provided on the work holder.

In the embodiment described above, two rail inner walls 17 are provided that divide the space between the two rail outer walls 15 that define the left and right edges of the rail 11 into three gaps in the left and right direction, and the harness 202 and the protector 212 are provided in three gaps. Although the harness 202 and the protector 212 are arranged to pass through the gap located at the right end of the three gaps, the harness 202 and the protector 212 may be arranged so as to pass through the gap located at the left end of the three gaps.

Also described herein are alternate embodiments of a rail for a sliding assembly. The assembly may include a screw that is driven by a motor, and the rail includes at least one sidewall and one or more engagement slots (also referred to herein as engagement holes, such as holes 59L and 59R) formed within the sidewall for engaging the screw. The engagement slots receive a lobe of the screw (i.e., the lobe extends into the engagement slot) such that rotation of the screw causes translation of the assembly along the rail.

The rail includes a plurality of engagement slots that are configured to inhibit back drive and eliminate slop (i.e., rattling) between the rail and the lobes of the screw. Each engagement slot includes a clearance portion disposed between an upper engagement portion and a lower engagement portion. During operation, variation in the load placed on the assembly causes the screw to move within the rail which may result in misalignment relative to the engagement slot. The clearance portion is sized so that the lobes do not contact the engagement slot in the clearance portion. Rather, the lobes of the screw contact the engagement slot only within the upper and lower engagement portion even under varying operating loads and manufacturing tolerances. Maintaining contact between the lobe and the engagement slot in only the upper and lower engagement portions inhibits backdrive. In addition, adequate vertical clearance is maintained between the screw and the upper and lower edges of the engagement slot to reduce operating sounds and drive efforts. Finally, the clearance portion allows for greater variation in the angular variation of the slot relative to the thread angle of the screw while maintaining contact in the desired upper and lower engagement portions. The presently disclosed rail may be particularly beneficial for longer rails with increased manufacturing and operating tolerances, such as those extending between two or more rows of seats in a vehicle.

Referring now to FIGS. 28-31, several additional examples of engagement slot configurations within the scope of the present disclosure are described. The engagement slots described with reference to FIGS. 28-31 may also be referred to as engagement holes and embody alternative designs that may utilized in lieu of the engagement holes 59 described with reference to FIGS. 9-10 and 13-14. Accordingly, the subject matter described above in association with the engagement holes 59 shown in FIGS. 9-10 and 13-14 may also apply to the engagement slots described below in FIGS. 28-31.

Figure 28:
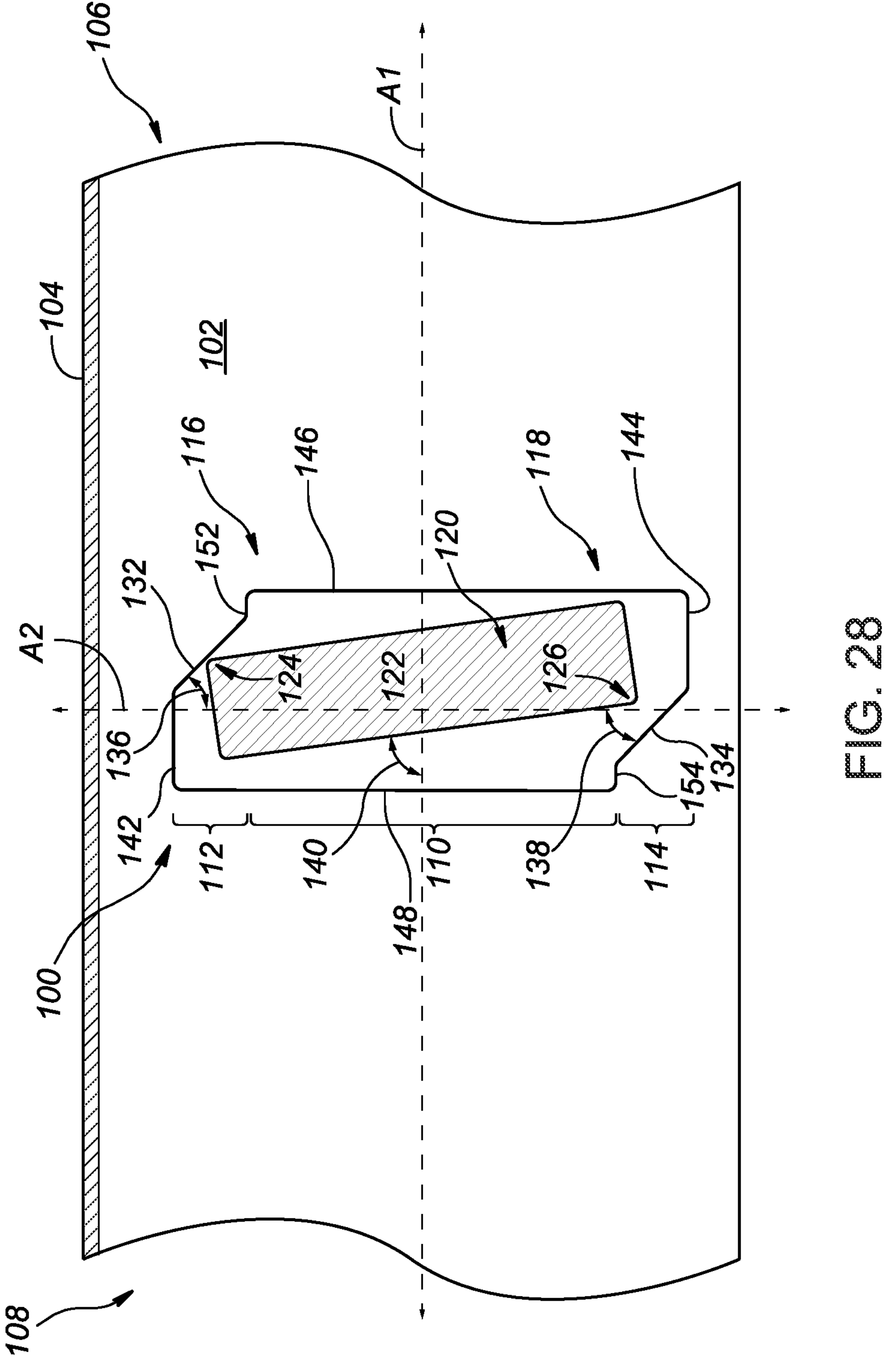
FIG. 28 is another example engagement slot formed in a sidewall of a slide rail.

FIG. 28 depicts an example engagement slot 100, according to one or more embodiments of the present disclosure. As shown, the engagement slot 100 (hereinafter, the slot 100) is formed in a sidewall 102 of a rail 104. The rail 104 may be similar to the rail 11, detailed above, and extends along an axis A1 and includes a front end 106 and a rear end 108 opposite the front end 106. Also, while the rail 104 is depicted with just a single sidewall 102 in FIG. 29, it should be appreciated that it may have more than one sidewall 102, for example, the rail 104 may include a pair of sidewalls, with the pair of sidewalls having at least one corresponding pair of slots configured as described herein.

As shown, the slot 100 includes a clearance portion 110, an upper engagement portion 112, and a lower engagement portion 114. The upper engagement portion 112 is in communication with an upper end 116 of the clearance portion 110, and the lower engagement portion 114 is in communication with a lower end 118 of the clearance portion 110. Also, as shown, the slot 100 extends along a second axis A2. In the illustrated embodiment, the second axis A2 is perpendicular to the axis A1.

In the illustrated embodiment, the slot 100 extends parallel with the second axis A2 and perpendicular to the axis A1. However, in other embodiments, the slot 100 extends obliquely with respect to the second axis A2, for example, as described with reference to the engagement holes 59 in FIGS. 9-10 and 13-14. Also, in embodiments, each of the slots 100 is oriented in the same angle relative to the second axis A2; however, in other embodiments, one or more of the slots 100 may be oriented differently than the others.

A drive screw 120 having a thread circumferentially wrapped around the a body of the drive screw 120 is utilized the drive the rail 104. As shown, the thread of the drive screw 120 defines a lobe 122 that extends into the slot 100, such that the slot 100 receives the lobe 122.

During use, the clearance portion 110 of the slot 100 provides clearance for a portion of the lobe 122 of the screw 120. In this manner, undesirable abrasion/contact between the rail 104 and the screw 120 is inhibited in the clearance portion 110. Rather, contact between the screw 120 and the rail 104 occurs only in the upper engagement portion 112 and the lower engagement portion 114. Thus, the upper engagement portion 112 and the lower engagement portion 114 are configured to engage the screw 120, with the upper engagement portion 112 having a leading contact edge 132 arranged to contact a leading lobe 124 of the screw 120 and the lower engagement portion 114 having a trailing contact edge 134 arranged to contact a trailing lobe 126 of the screw 120.

In embodiments, the upper engagement portion 112 and the lower engagement portion 114 are configured to engage the screw 120 only within 10% of an outer diameter of the screw 120. However, in embodiments, the upper engagement portion 112 and the lower engagement portion 114 are configured to engage the screw 120 only within 20%, 30%, or 35%, of an outer diameter of the screw 120.

In the illustrated embodiment, the leading contact edge 132 and the trailing contact edge 134 are each oriented at an angle 136, 138 relative to the second axis A2. In embodiments, the leading contact edge 132 and the trailing contact edge 134 are each oriented at the same angle relative to the second axis A2 (i.e., angle 136 is equal to angle 138), such as 45 degrees. However, the leading contact edge 132 and the trailing contact edge 134 may be oriented at different angles relative to the second axis A2 (i.e., angle 136 is not equal to angle 138). In embodiments, the angle 136 of the leading contact edge 132 and the angle 138 of the trailing contact edge 134 are equal to or greater than the thread angle 140 of the screw 120. In the illustrated embodiment, the leading contact edge 132 and the trailing contact edge 134 are each angled such that they extend (and are slanted) in a rearward direction, but in other directions, they may be angled such that they extend (and are slanted) in a forward direction, for example, as described with reference to the engagement holes 59 in FIGS. 9-10 and 13-14.

The clearance portion 110 of the slot 100 is configured such that the screw 120 does not contact the slot 100 in the clearance portion 110. Rather, as mentioned, contact between the screw and the slot 100 occurs in the upper engagement portion 112 and the lower engagement portion 114. Thus, the clearance portion 110 of the slot 100 is wider (evaluated along the axis A1) than the upper engagement portion 112 and the lower engagement portion 114. In some embodiments, a width of the clearance portion 110 is the same as a width of at least one of the upper engagement portion 112 and/or the lower engagement portion 114.

In addition to having a width dimension measured along the axis A1, the slot 100 includes a length dimension that is measured along the second axis A2. As shown, the clearance portion 110 of the slot 100 constitutes a substantial portion of the overall length of the slot 100. For example, the clearance portion 110 of the slot 100 has a length (evaluated along the second axis A2) that is at least 50% of the overall length of the slot 100, evaluated along the second axis A2. In other embodiments, the length of the clearance portion 110 of the slot 100 is at least 40%, or at least 30% of the overall length of the slot 100, evaluated along the second axis A2.

The upper engagement portion 112 includes an upper edge 142 that joins the leading contact edge 132, and the lower engagement portion 114 includes a lower edge 144 that joins the trailing contact edge 134. The slot 100 also includes a leading edge 146 and a trailing edge 148, with the trailing edge 148 joining the upper edge 142 and the leading edge 146 joining the lower edge 144. In the illustrated embodiment, the upper edge 142 and the lower edge 144 are oriented parallel to the axis A1 and perpendicular to the second axis A2, however, either or both of the edges 142, 144 edges may be differently oriented. Further, in the illustrated embodiment, the upper engagement portion 112 includes a stepped edge 152 extending between the leading edge 146 and the leading contact edge 132, and the lower engagement portion 114 includes a stepped edge 154 extending between the trailing edge 148 and the trailing contact edge 134. In the illustrated embodiment, the stepped edges 152, 154 are oriented parallel to the axis A1 (and parallel to the upper edge 142 and the lower edge 144) and perpendicular to the second axis A2, however, either or both of the stepped edges 152, 154 may be differently oriented.

Figure 29:
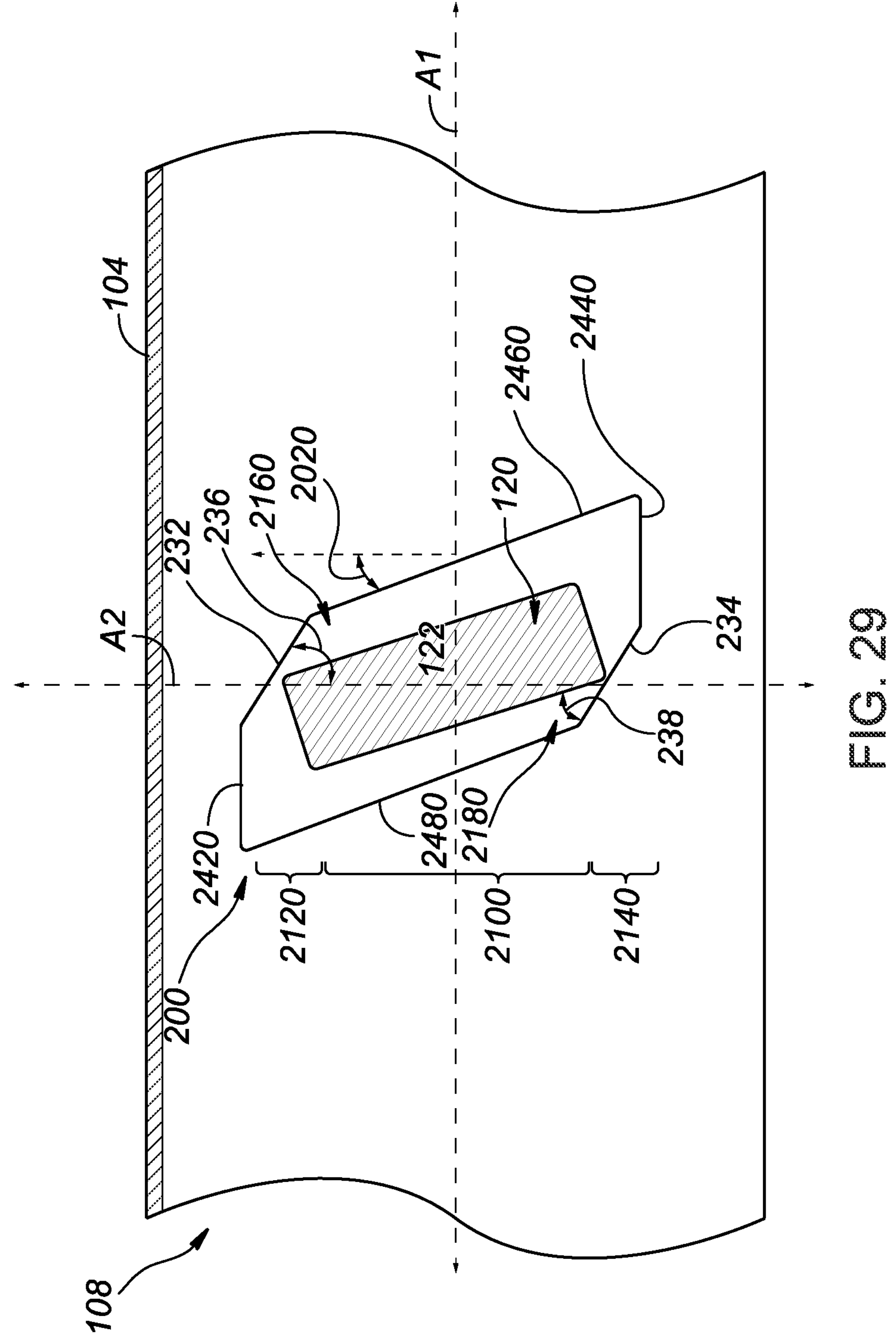
FIG. 29 is another example engagement slot formed in a sidewall of a slide rail.

FIG. 29 depicts another example of an engagement slot 200, according to one or more embodiments of the present disclosure. In the illustrated embodiment, the engagement slot 200 (hereinafter, the slot 200) extends obliquely with respect to the second axis A2, rather than parallel to the second axis A2 (and perpendicular to the axis A1) as shown with regard to the slot 100 of FIG. 15. In particular, the slot 200 is oriented at an angle 2020 relative to the second axis A2. In embodiments, the slot 200 may be obliquely oriented at an angle 2020 of 20 degrees relative to the second axis A2 to match a thread angle of the screw. However, the slot 200 may be obliquely oriented other angles equal to, greater than, or less than the thread angle of the screw depending on the configuration of the slot. In the illustrated embodiment, the slot 200 is angled such that it extends (and is slanted) in a rearward direction, but in other directions, the slot 200 may be angled such that it extends (and is slanted) in a forward direction, for example, as described with reference to the engagement holes 59 in FIGS. 9-10 and 13-14.

As shown, the slot 200 includes a clearance portion 2100, an upper engagement portion 2120, and a lower engagement portion 2140. The upper engagement portion 2120 is in communication with an upper end 2160 of the clearance portion 2100, and the lower engagement portion 2140 is in communication with a lower end 2180 of the clearance portion 2100.

As with the slot 100, the upper engagement portion 2120 and the lower engagement portion 2140 of the slot 200 are configured to engage the screw 120, with the upper engagement portion 2120 having a leading contact edge 232 arranged to contact a leading lobe 124 of the screw 120 and the lower engagement portion 2140 having a trailing contact edge 234 arranged to contact a trailing lobe 126 of the screw 120.

In the illustrated embodiment, the leading contact edge 232 and the trailing contact edge 234 are each oriented at an angle 236, 238 relative to the second axis A2. In embodiments, the leading contact edge 232 and the trailing contact edge 234 are each oriented at the same angle relative to the second axis A2 (i.e., angle 236 is equal to angle 238), such as 45 degrees. However, the leading contact edge 232 and the trailing contact edge 234 may be oriented at different angles relative to the second axis A2 (i.e., angle 236 is not equal to angle 238). In the illustrated embodiment, the leading contact edge 232 and the trailing contact edge 234 are each angled such that they extend (and are slanted) in a rearward direction, but in other directions, they may be angled such that they extend (and are slanted) in a forward direction, for example, as described with reference to the engagement holes 59 in FIGS. 9-10 and 13-14.

The upper engagement portion 2120 includes an upper edge 2420 that joins the leading contact edge 232, and the lower engagement portion 2140 includes a lower edge 2440 that joins the trailing contact edge 234. The slot 200 also includes a leading edge 2460 and a trailing edge 2480, that are each oriented at the angle 2020 relative to the second axis A2, with the trailing edge 2480 joining the upper edge 2420 and the trailing contact edge 234, and with the leading edge 2460 joining the lower edge 144 and the leading contact edge 232. In the illustrated embodiment, the upper edge 2420 and the lower edge 2440 are oriented parallel to the axis A1 and perpendicular to the second axis A2, however, either or both of the edges 2420, 2440 edges may be differently oriented.

As described above with reference to FIGS. 28-29, the width of the upper and lower engagement portions may be the same, and the width of the upper and lower engagement portions may be smaller than a width of the clearance portion. In other embodiments, however, the clearance portion may include a width that is the same as the width of the upper engagement portion and/or the lower engagement portion.

Figure 30:
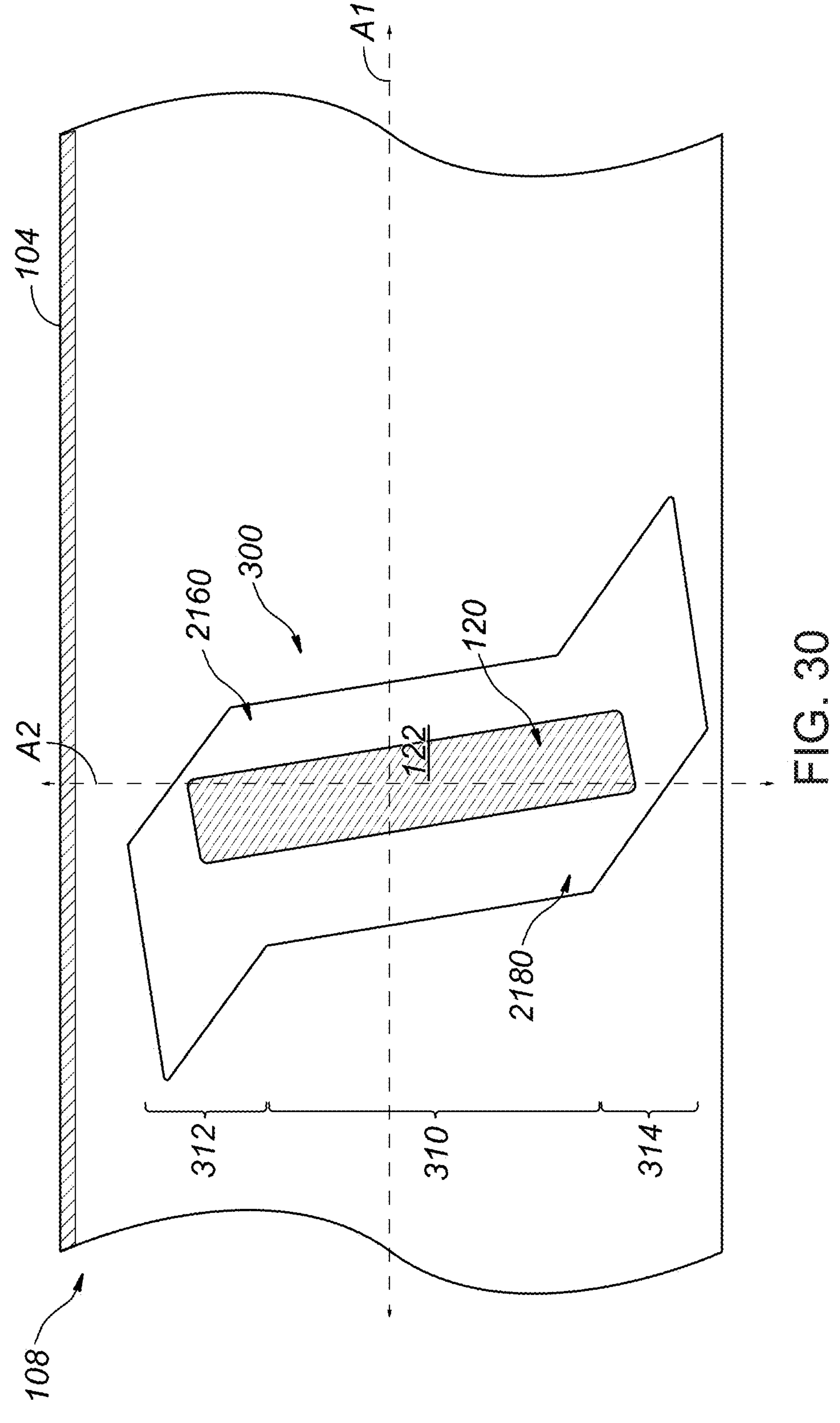
FIG. 30 is another example engagement slot formed in a sidewall of a slide rail.

FIG. 30 depicts another example of an engagement slot 300, according to one or more embodiments of the present disclosure. In the illustrated embodiment, the engagement slot 300 (hereinafter, the slot 300). In the illustrated embodiment, the slot 300 includes a clearance portion 310, an upper engagement portion 312, and a lower engagement portion 314. In this embodiment, the clearance portion 310, the upper engagement portion 312 and the lower engagement portion 314 have substantially the same width, as measured along the axis A1. The upper engagement portion 312 and the lower engagement portion 314 each include a contact edge and, while the contact edges are depicted as being substantially straight edges in FIG. 30, in other embodiments, the contact edges of the upper engagement portion 312 and the lower engagement portion 314 are stepped and/or include a curvature. In the illustrated embodiment, the slot 300 and its upper and lower engagement portions 312, 314 are angled such that they extend (and are slanted) in a rearward direction, but in other directions, they may be angled such that they extend (and are slanted) in a forward direction, for example, as described with reference to the engagement holes 59 in FIGS. 9-10 and 13-14.

Figure 31:
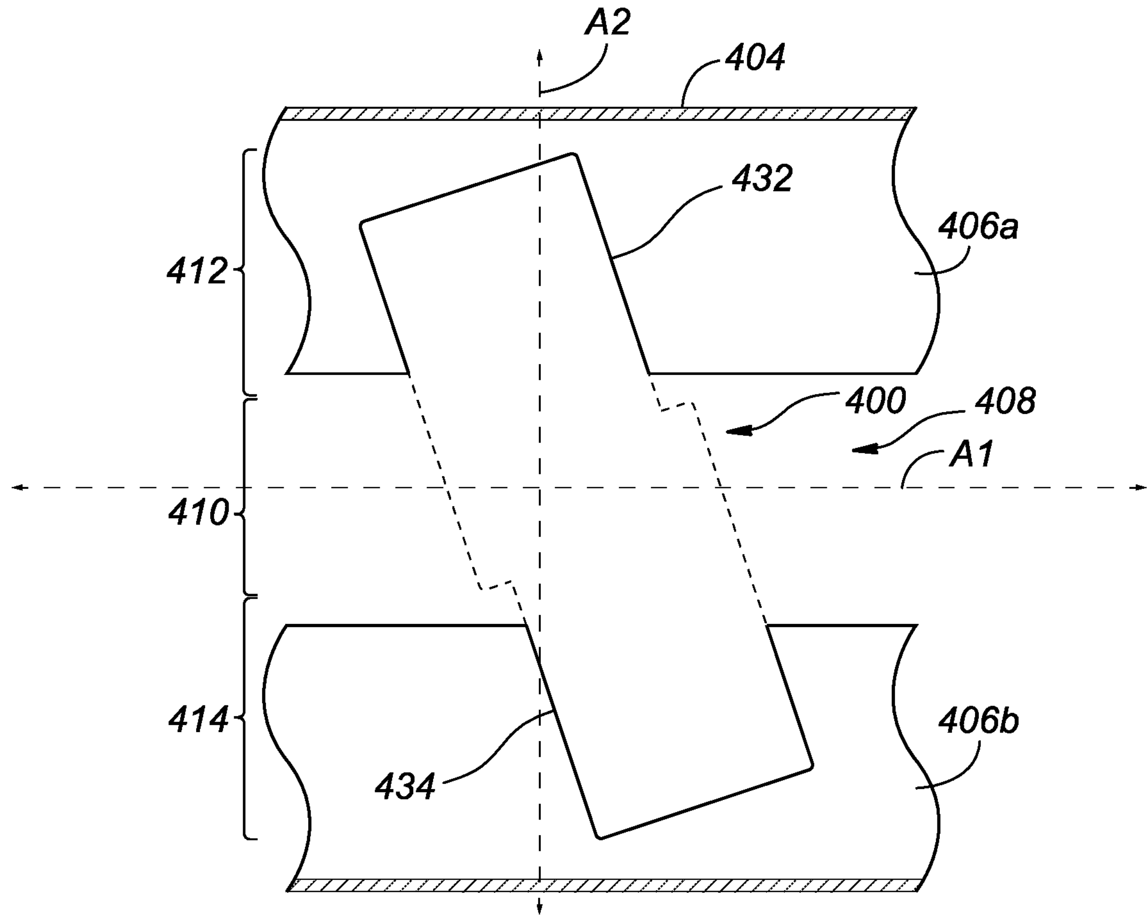
FIG. 31 is another example engagement slot formed in a sidewall of a slide rail.

FIG. 31 depicts an example slot 400 utilizable with an open or split rail 404, according to one or more embodiments of the present disclosure. As shown, the split rail 404 includes an upper sidewall portion 406*a* and a lower sidewall portion 406*b*. The upper sidewall portion 406*a* is separated from the lower sidewall portion 406*b* via a gap/void 408.

In the illustrated embodiment, the slot 400 includes a clearance portion 410, an upper engagement portion 412, and a lower engagement portion 414. The clearance portion 410 is defined by the gap/void 408 and extends between the upper sidewall portion 406*a* and the lower sidewall portion 406*b*. Also, the upper engagement portion 412 is defined or formed within the upper sidewall 406*a*, and the lower engagement portion 414 is defined or formed within the lower sidewall 406*b*. The upper engagement portion 412 and the lower engagement portion 414 of the slot 400 are configured to engage the screw 120, with the upper engagement portion 412 having a leading contact edge 432 arranged to contact a leading lobe 124 of the screw 120 and the lower engagement portion 414 having a trailing contact edge 434 arranged to contact a trailing lobe 126 of the screw 120. In the illustrated embodiment, the slot 400, together with its leading contact edge 432 and trailing contact edge 434, are angled such that they extend (and are slanted) in a rearward direction, but in other directions, they may be angled such that they extend (and are slanted) in a forward direction, for example, as described with reference to the engagement holes 59 in FIGS. 9-10 and 13-14.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The invention claimed is:

1. A rail for a sliding assembly including a screw member, the rail comprising:

a sidewall extending along a rail axis and having a front end and a rear end;

a plurality of engagement slots formed in the sidewall between the front end and the rear end, each of the plurality of engagement slots having a clearance portion, an upper engagement portion in communication with an upper end of the clearance portion, and a lower engagement portion in communication with a lower end of the clearance portion;

wherein each of the plurality of engagement slots extends with respect to a second axis perpendicular to the rail axis;

wherein the upper engagement portion and the lower engagement portion are configured to engage the screw member; and wherein each of the plurality of engagement slots extends obliquely with respect to a second axis perpendicular to the rail axis.

2. The rail of claim 1, wherein the upper engagement portion and the lower engagement portion are configured to engage the screw member only within 30% of an outer diameter of the screw member.

3. The rail of claim 1, wherein the lower engagement portion has a trailing contact edge oriented at an angle equal to or greater than a thread angle of the screw member.

4. The rail of claim 1, wherein the clearance portion is configured such that the screw member does not contact the engagement slot in the clearance portion.

5. The rail of claim 1, wherein the engagement slot has a length along the second axis, and the clearance portion a length greater than 50% of the length of the engagement slot.

6. The rail of claim 1, wherein a width of the upper engagement portion is the same as a width of the lower engagement portion in the direction of the rail axis.

7. The rail of claim 1, wherein a width of the clearance portion is the same as a width of at least one of the upper engagement portion or the lower engagement portion in the direction of the rail axis.

8. The rail of claim 1, wherein the sidewall includes an upper side wall portion a lower sidewall portion, and the upper sidewall portion is separated from the lower sidewall portion, and wherein the upper engagement portion is formed in the upper sidewall portion, the lower engagement portion is formed in the lower sidewall portion, and the clearance portion extends between the upper sidewall portion and the lower sidewall portion.

9. The rail of claim 1, wherein each of the plurality of engagement slots extends perpendicular to the rail axis.

10. A rail for a sliding assembly including a screw member, the rail comprising:

a sidewall extending along a rail axis and having a front end and a rear end;

a plurality of engagement slots formed in the sidewall between the front end and the rear end, each of the plurality of engagement slots having a clearance portion, an upper engagement portion in communication with an upper end of the clearance portion, and a lower engagement portion in communication with a lower end of the clearance portion;

wherein each of the plurality of engagement slots extends with respect to a second axis perpendicular to the rail axis;

wherein the upper engagement portion and the lower engagement portion are configured to engage the screw member; and wherein the upper engagement portion has a leading contact edge oriented at an angle equal to or greater than a thread angle of the screw member.

11. An electric slide rail, a rail having a groove-shaped cross section and extending along the first direction;

a slider received in and slidably engaged with the rail;

a screw assembly including a screw member rotatably supported by the slider about the first direction;

an electric motor supported by the slider and rotating the screw member;

a threaded engagement portion extending in the first direction and formed on the rail so as to engage with the threaded member;

wherein the rail has a pair of side walls facing each other, the screw engagement portion has a plurality of engagement holes formed in each of the pair of side walls and arranged in the first direction, each of the engagement holes extends obliquely with respect to a second direction orthogonal to the first direction, and includes a first portion disposed at the center in the longitudinal direction, and a pair of second portions disposed on both sides of the first portion, and a width of each of the second portions in the first direction is smaller than a width of the first portion in the first direction, such that the screw member does not contact an edge of the engagement hole in the first portion, but contacts the edge of the engagement hole in at least one of the second portions.

12. The electric slide rail according to claim 11, wherein the screw member abuts the edge at one of the second portions.

13. The electric slide rail according to claim 12, wherein the screw member abuts the edge of one of the second portions in the first direction.

14. The electric slide rail according to claim 11, wherein the edge of the engagement hole has a stepped portion at a boundary between the first portion and the second portion.

15. The electric slide rail according to claim 11, wherein a gap is formed between the screw member and an edge that forms the end of the second portion in the second direction within the edge.

16. The electric slide rail according to claim 15, wherein the edge portion extends parallel to the first direction.

17. The electric slide rail according to claim 11, wherein the pair of side walls are formed with protrusions that protrude toward each other and extend in the first direction, and each of the engagement holes passes through the protrusions and extends in the second direction.

18. The electric slide rail according to claim 11, wherein one of the second portions is offset in the first direction with respect to the other of the second portions.

19. The electric slide rail according to claim 11, wherein each of the pair of second portions has the same length in the second direction.

* * * * *